US011251854B1

(12) United States Patent
Venkatesh et al.

(10) Patent No.: US 11,251,854 B1
(45) Date of Patent: Feb. 15, 2022

(54) METHODS AND APPARATUSES FOR CODEBOOK RESTRICTION FOR TYPE-II FEEDBACK REPORTING AND HIGHER LAYER CONFIGURATION AND REPORTING FOR LINEAR COMBINATION CODEBOOK IN A WIRELESS COMMUNICATIONS NETWORK

(71) Applicant: Fraunhofer-Gesellschaft zur Förderung der angewandten Forschung e.V., Munich (DE)

(72) Inventors: Ramireddy Venkatesh, Erlangen (DE); Marcus Grossmann, Erlangen (DE); Markus Landmann, Erlangen (DE)

(73) Assignee: Fraunhofer-Gesellschaft zur Forderung der angewandten Forschung e.V.

(*) Notice: Subject to any disclaimer, the term of this patent is extended or adjusted under 35 U.S.C. 154(b) by 0 days.

(21) Appl. No.: 17/264,917

(22) PCT Filed: Dec. 16, 2019

(86) PCT No.: PCT/EP2019/085226
§ 371 (c)(1),
(2) Date: Feb. 1, 2021

(87) PCT Pub. No.: WO2020/126960
PCT Pub. Date: Jun. 25, 2020

(30) Foreign Application Priority Data

Dec. 22, 2018 (EP) .................................. 18215815
Feb. 1, 2019 (EP) .................................. 19155102
Mar. 25, 2019 (EP) .................................. 19164947

(51) Int. Cl.
*H04B 7/06* (2006.01)
*H04B 7/0456* (2017.01)
(Continued)

(52) U.S. Cl.
CPC ......... *H04B 7/0639* (2013.01); *H04B 7/0469* (2013.01); *H04B 7/0478* (2013.01);
(Continued)

(58) Field of Classification Search
CPC .... H04W 72/04; H04W 88/08; H04B 7/0639; H04B 7/0478; H04B 7/0469; H04B 7/0626; H04B 7/063; H04B 7/0634
See application file for complete search history.

(56) References Cited

U.S. PATENT DOCUMENTS

2017/0105048 A1* 4/2017 Stein ..................... G06F 3/0482
2019/0132031 A1* 5/2019 Park ..................... H04B 7/0469
(Continued)

OTHER PUBLICATIONS

Fraunhofer Iis et al.: "Enhancements on Type-II CSI reporting", 3GPP Draft; R1-1813130, 3rd Generation Partnership Project (3GPP), Mobile Competence Centre; 650, Route Des Lucioles; F-06921 Sophia-Antipolis Cedex France.
(Continued)

*Primary Examiner* — Hassan A Phillips
*Assistant Examiner* — Prenell P Jones
(74) *Attorney, Agent, or Firm* — Burr & Forman LLP; Jeffrey H. Kamenetsky

(57) ABSTRACT

Method performed by a UE for providing a channel state information (CSI) feedback in a wireless communication system including at least the UE and a gNB or a radio network node. The UE is operative to: estimate the MIMO channel between the gNB and the UE based on received DL reference signals for the configured resource blocks. The UE is further operative to calculate, based on a performance metric, a precoder matrix, for a number of antenna ports of the gNB and configured subbands, the precoder matrix being based on two codebooks and a set of combination coefficients for complex scaling/combining one or more of vectors selected from a first codebook and a second codebook, and
(Continued)

the UE is operative to report a CSI feedback and/or a PMI and/or a PMI/RI, to the gNB, used to indicate the precoder matrix for the configured antenna ports and resource blocks.

26 Claims, 22 Drawing Sheets

(51) Int. Cl.
 *H04W 72/04* (2009.01)
 *H04W 88/08* (2009.01)
 *H04W 76/00* (2018.01)
(52) U.S. Cl.
 CPC .......... *H04B 7/063* (2013.01); *H04B 7/0626* (2013.01); *H04B 7/0634* (2013.01); *H04W 72/04* (2013.01); *H04W 76/00* (2013.01); *H04W 88/08* (2013.01)

(56) References Cited

U.S. PATENT DOCUMENTS

| | | | |
|---|---|---|---|
| 2019/0260434 A1* | 8/2019 | Park | H04B 7/0456 |
| 2020/0083938 A1* | 3/2020 | Park | H04B 7/0639 |
| 2020/0091975 A1* | 3/2020 | Park | H04L 5/0037 |
| 2020/0177252 A1* | 6/2020 | Park | H04B 7/0626 |
| 2020/0186207 A1* | 6/2020 | Davydov | H04B 7/0417 |
| 2020/0280352 A1* | 9/2020 | Park | H04B 7/0632 |

OTHER PUBLICATIONS

3rd Generation Partnership Project; Technical Specification Group Radio Access Network; NR; Physical Layer Procedures for Data (Release 15), 3GPP Standard; Technical Specification; 3GPP TS 38.214 V15.3.0 (Sep. 2018), 650, Route Des Lucioles; F-06921 Sophia-Antipolis Cedex; France.
International Search Report, International Application No. PCT/EP2019/085226, dated Feb. 24, 2020, European Patent Office.

* cited by examiner

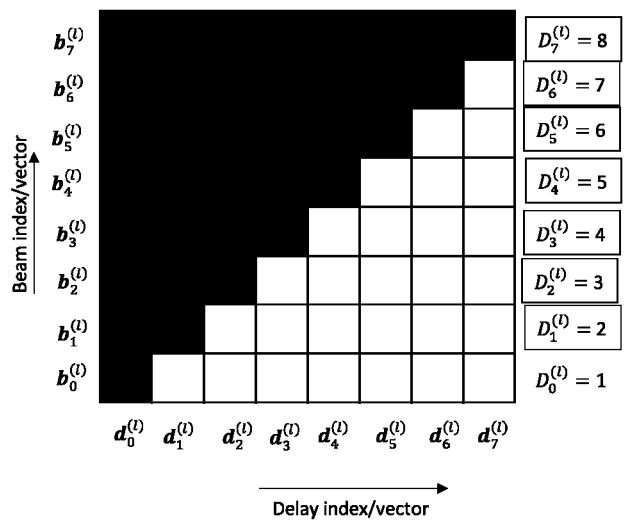
Fig. 1: Example of delay configuration when $D_0^{(l)} = 1$ for the first beam (leading beam) and $D_{U-1}^{(l)} = U$ for the last $(U-1)$-th beam and the number of delays/delay vectors is increasing with the beam index; U=8.

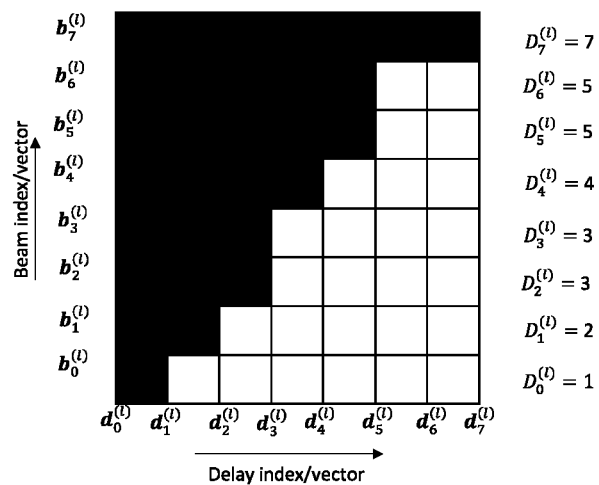
Fig. 2: Example of delay configuration when $D_0^{(l)} = 1$ for the first beam (leading beam) and $D_{U-1}^{(l)} = N$ for the $(U-1)$-th beam and the number of delays/delay vectors is increasing with the beam index; U=8, N=7.

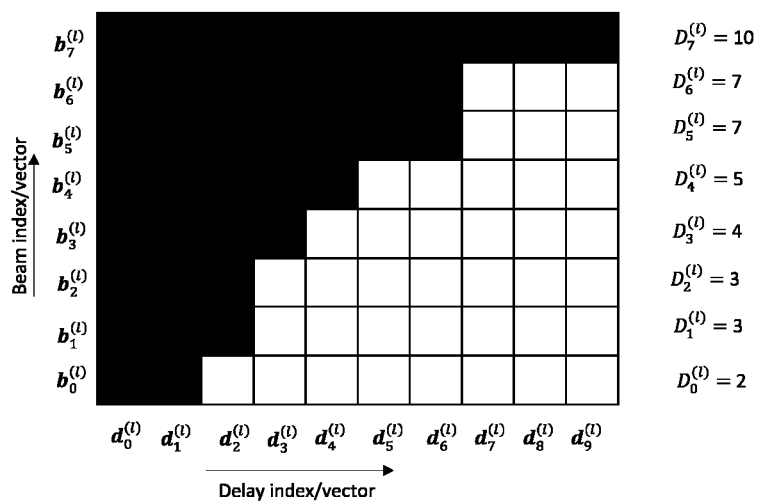
Fig. 3: Example of delay configuration when $D_0^{(l)} = N_1$ for the first beam (leading beam) and $D_{U-1}^{(l)} = N_2$ for the $(U-1)$-th beam and the number of delays/delay vectors is increasing with the beam index; $U = 8$, $N_1 = 2$ and $N_2 = 10$.

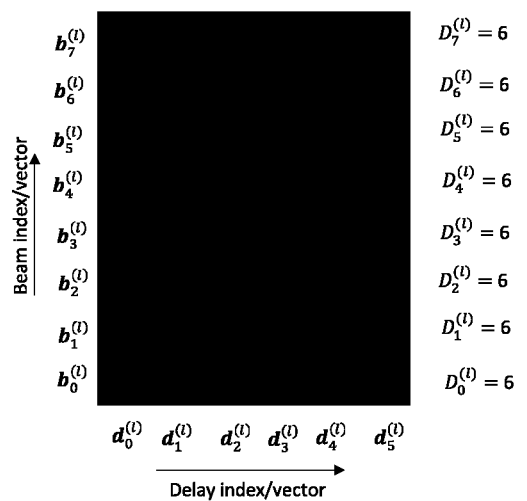
Fig. 4: Example of delay configuration when $D_0^{(l)} = .. D_{U-1}^{(l)} = D$ for all beams; $U = 8$ and $D_0^{(l)} = \cdots D_7^{(l)} = 6$

|  | Scheme 1<br>(Selection of $K$ strongest coefficients)<br>$B_{l,p,i,j} = 3 \forall p, i, j$ | | | |
|---|---|---|---|---|
| Value of $K$ | $K = 12$ | $K = 24$ | $K = 30$ | $K = 40$ |
| Number of beams and delays $(2U^{(l)}, D)$ | (8,3) | (8,6) | (8,8) | (8,12) |
| Number. of bits for reporting the beam amplitudes ($a_{l,p,i}$) | | | | |
| No. of bits for delay amplitudes ($c_{l,p,j}$) | | | | |
| Number of bits for combining coefficients | 36 | 72 | 90 | 120 |
| No of bits for bitmap (indication of $K$ strongest coefficients) | 24 | 48 | 64 | 96 |
| Total number of bits to be reported | 60 | 120 | 154 | 216 |

Fig. 5: Number of feedback bits for amplitude reporting of the $l$-th layer for scheme 1 in combination with selection of K combining coefficients assuming an identical number of delays/delay vectors per beam $(D_0^{(l)} = .. D_{U-1}^{(l)} = D)$; $U = 4$ per polarization.

|  | Scheme 2 $(A_{l,p,i} = 3 \; \forall p, i$ and $B_{l,p,i,j} = 2 \forall p, i, j)$ | | | |
|---|---|---|---|---|
| Number of beams and delays ($2U^{(l)}$, D) | (8,3) | (8,6) | (8,8) | (8,12) |
| Number. of bits for reporting the beam amplitudes ($a_{l,p,i}$) | 21 | 21 | 21 | 21 |
| No. of bits for delay amplitudes ($c_{l,p,j}$) |  |  |  |  |
| Number of bits for combining coefficients | 48 | 96 | 128 | 192 |
| No of bits for bitmap (indication of $K$ strongest coefficients) |  |  |  |  |
| Total number of bits to be reported | 69 | 117 | 149 | 213 |

Fig. 6: Number of feedback bits for amplitude reporting of the l-th layer for scheme 2 assuming an identical number of delays/delay vectors per beam ($D_0^{(l)} = .. D_{U-1}^{(l)} = D$); $U = 4$ per polarization. The strongest coefficient $a_{l,p,i}$ is not reported.

|  | Scheme 2 (Selection of K strongest coefficients) $(A_{l,p,i} = 3 \, \forall p, i$ and $B_{l,p,i,j} = 2 \forall p, i, j)$ | | | |
|---|---|---|---|---|
| Value of $K$ | K =12 | K = 24 | K = 30 | K = 40 |
| Number of beams and delays $(2U^{(l)}, D)$ | (8,3) | (8,6) | (8,8) | (8,12) |
| Number. of bits for reporting the beam amplitudes $(a_{l,p,i})$ | 21 | 21 | 21 | 21 |
| No. of bits for delay amplitudes $(c_{l,p,j})$ |  |  |  |  |
| Number of bits for combining coefficients | 24 | 48 | 60 | 80 |
| No of bits for bitmap (indication of $K$ strongest coefficients) | 24 | 48 | 64 | 96 |
| Total number of bits to be reported | 69 | 117 | 145 | 197 |

Fig. 7: Number of feedback bits for amplitude reporting of the l-th layer for scheme 2 in combination with selection of K combining coefficients assuming an identical number of delays/delay vectors per beam $(D_0^{(l)} = .. D_{U-1}^{(l)} = D)$; $U = 4$ per polarization. The strongest coefficient $a_{l,p,i}$ is not reported.

|  | Scheme 2 (Selection of K strongest coefficients) $(A_{l,p,i} = 3 \forall p, i$ and $B_{l,p,i,j} = 1 \forall p, i, j)$ | | | |
|---|---|---|---|---|
| Value of $K$ | $K = 12$ | $K = 24$ | $K = 30$ | $K = 40$ |
| Number of beams and delays $(2U^{(l)}, D)$ | (8,3) | (8,6) | (8,8) | (8,12) |
| Number of bits for reporting the beam amplitudes $(a_{l,p,i})$ | 21 | 21 | 21 | 21 |
| No. of bits for delay amplitudes $(c_{l,p,j})$ |  |  |  |  |
| Number of bits for combining coefficients | 12 | 24 | 30 | 40 |
| No of bits for bitmap (indication of strongest $K$ coefficients) | 24 | 48 | 64 | 96 |
| Total number of bits to be reported | 57 | 93 | 115 | 157 |

Fig. 8: Number of feedback bits for amplitude reporting of the l-th layer for scheme 2 in combination with selection of K combining coefficients assuming an identical number of delays/delay vectors per beam $(D_0^{(l)} = ..D_{U-1}^{(l)} = D)$; $U = 4$ per polarization. The strongest coefficient $a_{l,p,i}$ is not reported.

|  | Scheme 3 $(C_{l,p,j} = 3 \; \forall p,j$ and $B_{l,p,i,j} = 2 \forall p,i,j)$ | | | |
|---|---|---|---|---|
| Number of beams and delays $(2U^{(l)}, D)$ | (8,3) | (8,6) | (8,8) | (8,12) |
| Number. of bits for reporting the beam amplitudes $(a_{l,p,i})$ | | | | |
| No. of bits for delay amplitudes $(c_{l,p,j})$ | 6 | 15 | 21 | 33 |
| Number of bits for combining coefficients | 48 | 96 | 128 | 192 |
| No of bits for bitmap (indication of $K$ strongest coefficients) | | | | |
| Total number of bits to be reported | 54 | 111 | 149 | 225 |

Fig. 9: Number of feedback bits for amplitude reporting of the l-th layer for scheme 3 assuming an identical number of delays/delay vectors per beam $(D_0^{(l)} = .. D_{U-1}^{(l)} = D)$; $U = 4$ per polarization. The strongest coefficient $c_{l,p,j}$ is not reported.

|  | Scheme 3 (Selection of K strongest coefficients) ($C_{l,p,j} = 3 \,\forall p,j$ and $B_{l,p,i,j} = 2\forall p,i,j$) | | | |
|---|---|---|---|---|
| Value of K | K = 12 | K = 24 | K = 30 | K = 40 |
| Number of beams and delays ($2U^{(l)}$, D) | (8,3) | (8,6) | (8,8) | (8,12) |
| Number. of bits for reporting the beam amplitudes ($a_{l,p,i}$) |  |  |  |  |
| No. of bits for delay amplitudes ($c_{l,p,j}$) | 6 | 15 | 21 | 33 |
| Number of bits for combining coefficients | 24 | 48 | 60 | 80 |
| No of bits for bitmap (indication of K strongest coefficients) | 24 | 48 | 64 | 96 |
| Total number of bits to be reported | 54 | 111 | 145 | 209 |

Fig. 10: Number of feedback bits for amplitude reporting of the l-th layer for scheme 3 in combination with selection of K combining coefficients assuming an identical number of delays/delay vectors per beam ($D_0^{(l)} = ..D_{U-1}^{(l)} = D$); $U = 4$ per polarization. The strongest coefficient $c_{l,p,j}$ is not reported.

|  | Scheme 3 (Selection of K strongest coefficients) $(C_{l,p,j} = 3 \forall p,j$ and $B_{l,p,i,j} = 1 \forall p,i,j)$ | | | |
|---|---|---|---|---|
| Value of $K$ | $K = 12$ | $K = 24$ | $K = 30$ | $K = 40$ |
| Number of beams and delays $(2U^{(l)}, D)$ | (8,3) | (8,6) | (8,8) | (8,12) |
| Number. of bits for reporting the beam amplitudes $(a_{l,p,i})$ | | | | |
| No. of bits for delay amplitudes $(c_{l,p,j})$ | 6 | 15 | 21 | 33 |
| Number of bits for combining coefficients | 12 | 24 | 30 | 40 |
| No of bits for bitmap (indication of $K$ strongest coefficients) | 24 | 48 | 64 | 96 |
| Total number of bits to be reported | 42 | 87 | 115 | 169 |

Fig. 11: Number of feedback bits for amplitude reporting of the l-th layer for scheme 3 in combination with selection of K combining coefficients assuming an identical number of delays/delay vectors per beam $(D_0^{(l)} = .. D_{U-1}^{(l)} = D)$; $U = 4$ per polarization. The strongest coefficient $c_{l,p,j}$ is not reported.

|  | Scheme 4 $(A_{l,p,i} = 3 \forall p,i, C_{l,p,j} = 3 \forall p,j$ and $B_{l,p,i,j} = 1 \forall p,i,j)$ | | | |
|---|---|---|---|---|
| Number of beams and delays ($2U^{(l)}$, D) | (8,3) | (8,6) | (8,8) | (8,12) |
| Number of bits for reporting the beam amplitudes ($a_{l,p,i}$) | 21 | 21 | 21 | 21 |
| No. of bits for delay amplitudes ($c_{l,p,j}$) | 6 | 15 | 21 | 33 |
| Number of bits for combining coefficients | 24 | 48 | 64 | 96 |
| No of bits for bitmap (indication of K strongest coefficients) | | | | |
| Total number of bits to be reported | 51 | 84 | 106 | 150 |

Fig. 12: Number of feedback bits for amplitude reporting of the l-th layer for scheme 4 assuming an identical number of delays/delay vectors per beam ($D_0^{(l)} = .. D_{U-1}^{(l)} = D$); $U = 4$ per polarization. The strongest coefficients $a_{l,p,i}$ and $c_{l,p,j}$ are not reported.

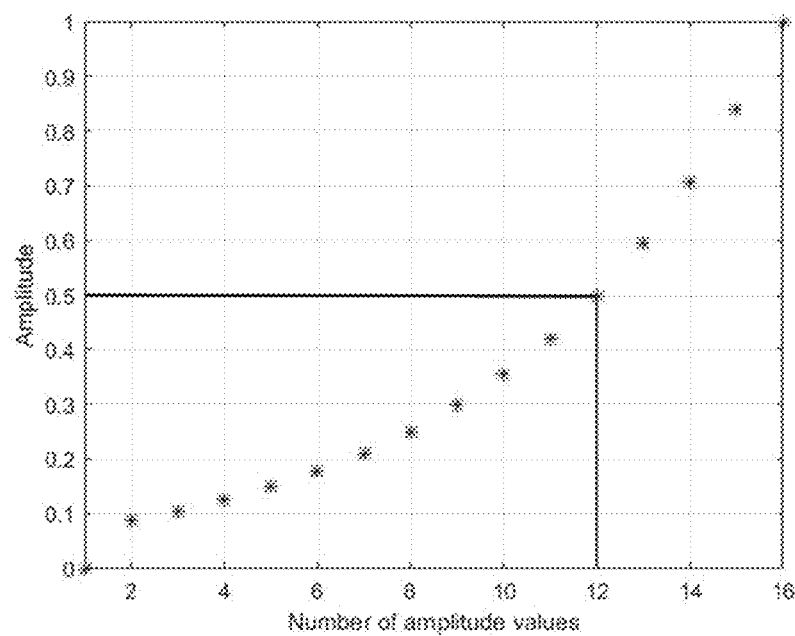
FIG. 20: Unequal distribution of the amplitude values of the non-linear amplitude set A for $N = 4$. 12 amplitude values lie in the range of '0' to '0.5' and 4 amplitude values lie in the range of '0.5' to '1'.

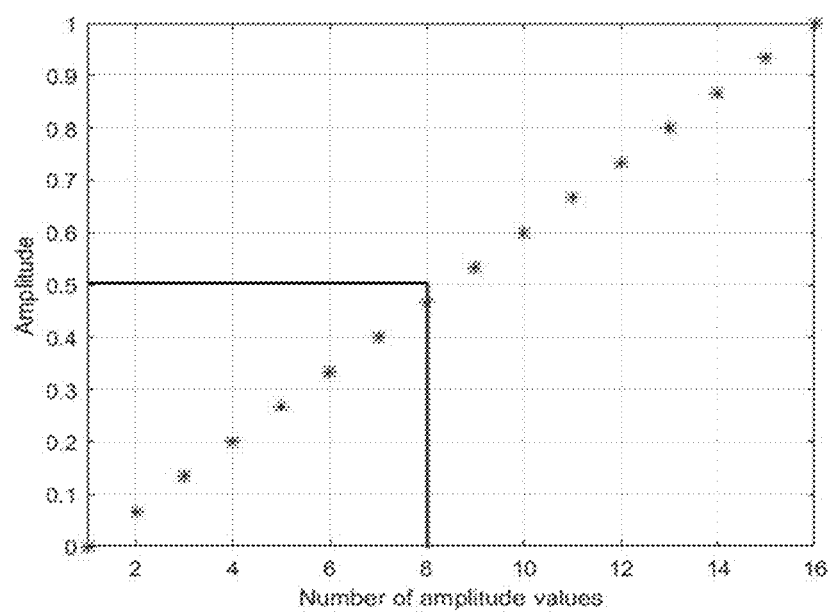
FIG. 21: Equal distribution of amplitude values over the entire range of '0' to '1' of the linear amplitude set A for $N = 4$

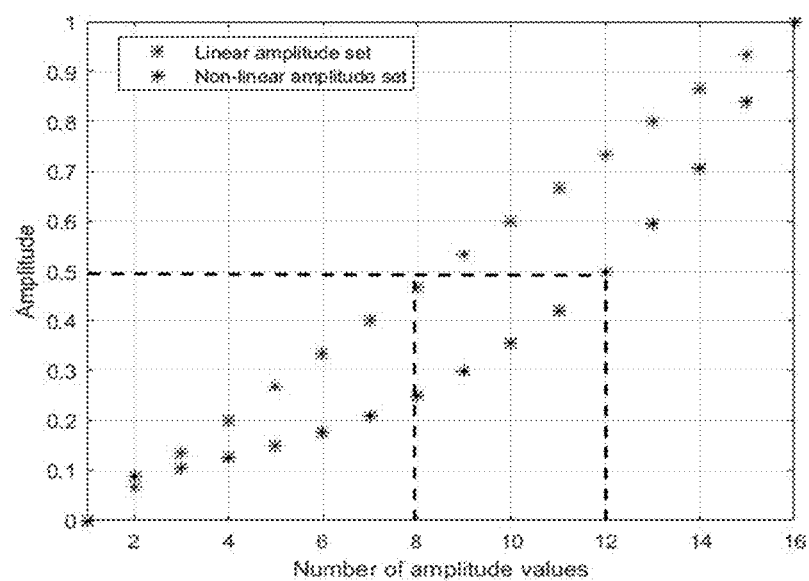
FIG. 22: Comparison of the distribution of the amplitude values from non-linear and linear amplitude sets for $N = 4$. In contrast to the non-linear amplitude set, where 12 values are allocated in the range of '0' to '0.5', only 8 values are allocated using the linear amplitude set

METHODS AND APPARATUSES FOR CODEBOOK RESTRICTION FOR TYPE-II FEEDBACK REPORTING AND HIGHER LAYER CONFIGURATION AND REPORTING FOR LINEAR COMBINATION CODEBOOK IN A WIRELESS COMMUNICATIONS NETWORK

CROSS-REFERENCE TO RELATED APPLICATION

This application is a national stage application, filed under 35 U.S.C. § 371, of International Patent Application No. PCT/EP2019/085226 filed on Dec. 16, 2019, European Patent Application No. 19164947.4 filed on Mar. 25, 2019, European Patent Application No. 19155102.7 filed on Feb. 1, 2019 and European Patent No. 18215815.4 filed on Dec. 22, 2018, each of which are incorporated by reference herein in its entirety.

TECHNICAL FIELD

The present disclosure relates to the field of wireless communications, and in particular, to methods and apparatuses for efficient feedback reporting for at least a New Radio- (NR-) based wireless communication network system, which feedback includes Channel State Information (CSI), and higher layer configuration and reporting for linear combination codebook.

BACKGROUND

In a wireless communications system, such as New Radio, also called 3GPP Fifth Generation wireless communications system or 5G for short, downlink (DL) and uplink (UL) signals convey data signals, control signals comprising DL control information (DCI) and/or uplink control information (UCI), and a number of reference signals (RSs) used for different purposes. A radio network node or a radio base station or a gNodeB (or gNB or gNB/TRP (Transmit Reception Point)) transmits data and DCI through the so-called physical downlink shared channel (PDSCH) and the physical downlink control channel (PDCCH), respectively.

A UE transmits data and UCI through the so-called physical uplink shared channel (PUSCH) and physical uplink control channel (PUCCH), respectively. Moreover, the DL or UL signal(s) of the gNB respectively the user equipment (UE or a radio device) may contain one or multiple types of RSs including a channel state information RS (CSI-RS), a demodulation RS (DM-RS), and a sounding RS (SRS). The CSI-RS (SRS) is transmitted over a DL (UL) system bandwidth part and used at the UE (gNB) for CSI acquisition. The DM-RS is transmitted only in a bandwidth part of the respective PDSCH/PUSCH and used by the UE/gNB for data demodulation.

One of many key feature of 5G is the use of multi-input multi-output (MIMO) transmission schemes to achieve high system throughput compared to previous generations of mobile systems. MIMO transmission generally demands the availability of accurate CSI used at the gNB for a signal precoding using a precoding matrix of the data and control information. The current third Generation Partnership Project Release 15 specification (3GPP Rel. 15) therefore provides a comprehensive framework for CSI reporting. The CSI is acquired in a first step at the UE based on received CSI-RS signals transmitted by the gNB. The UE determines in a second step based on the estimated channel matrix a precoding matrix from a predefined set of matrices called 'codebook'. The selected precoding matrix is reported in a third step in the form of a precoding matrix identifier (PMI) and rank identifier (RI) to the gNB.

In the current Rel.-15 NR specification, there exist two types (Type-I and Type-II) for CSI reporting, where both types rely on a dual-stage (i.e., two components) $W_1 W_2$ codebook. The first codebook, or the so-called first stage precoder, $W_1$, is used to select a number of beam vectors from a Discrete Fourier Transform-based (DFT-based) matrix which is also called the spatial codebook. The second codebook, or the so-called second stage precoder $W_2$, is used to combine the selected beams. For Type-I and Type-II CSI reporting, $W_2$ contains phase-only combining coefficients and complex combing coefficients, respectively. Moreover, for Type-II CSI reporting, $W_2$ is calculated on a subband basis such that the number of columns of $W_2$ depends on the number of configured subbands. Here, a subband refers to a group of adjacent physical resource blocks (PRBs). Although Type-II provides a significant higher resolution than Type-I CSI feedback, one major drawback is the increased feedback overhead for reporting the combining coefficients on a subband basis. The feedback overhead increases approximately linearly with the number of subbands, and becomes considerably large for large numbers of subbands. To overcome the high feedback overhead of the Rel.-15 Type-II CSI reporting scheme, it has recently been decided in 3GPP RAN #81 [2] (3GPP radio access network (RAN) 3GPP RAN #81) to study feedback compression schemes for the second stage precoder $W_2$.

As will be described in according with some embodiments herein, a problem of how to compress and efficiently quantize the combining coefficients of $W_2$ is addressed.

But before going into the detailed description of the solution(s) of the present embodiments, an informative description is provided in order to better understand the problems of the prior art followed by a described how said problems are solved according to the embodiments of the present disclosure.

3GPP Rel.-15 Dual-Stage Precoding and CSI Reporting

Assuming a rank-L (L may be up to two) transmission and a dual-polarized antenna array at the gNB with configuration $(N_1, N_2, 2)$, the Rel.-15 double-stage precoder for the s-th subband for a layer is given by $$W(s) = W_1 w_2(s),$$

$$= W_1 W_A \hat{w}_2(s) \qquad (1)$$

where the precoder matrix W has $2N_1 N_2$ rows corresponding to the number of antenna ports, and S columns for the reporting subbands/PRBs. The matrix $W_1 \in \mathbb{C}^{2N_1 N_2 \times 2U}$ is the wideband first-stage precoder containing 2U spatial beams for both polarizations, which are identical for all S subbands, and $W_A$ is a diagonal matrix containing 2U wideband amplitudes associated with the 2U spatial beams, and $\hat{w}_2(s)$ is the second-stage precoder containing 2U subband (subband amplitude and phase) complex frequency-domain combining-coefficients associated with the 2U spatial beams for the s-th subband.

According to [1], the reporting and quantization of the wideband amplitude matrix $W_A$ and subband combining coefficients in $\hat{w}_2(s)$ are quantized and reported as follows:

The wideband amplitude corresponding to the strongest beam which has an amplitude value of 1 is not reported. The wideband amplitude values associated with the remaining 2U−1 beams are reported by quantizing each amplitude value with 3 bits.

The subband amplitudes and phase values of the coefficients associated with the first leading beam are not reported (they are assumed to be equal to 1 and 0).

For each subband, the amplitudes of the B coefficients associated with the first B−1 leading beams (other than the first leading beam) are quantized with 1 bit (quantization levels [sqrt(0.5), 1]. The amplitude values of the remaining 2U−B beams are not reported (they are assumed to be equal to 1).

For each subband, the phase values of the B−1 coefficients associated with the first B−1 leading beams (other than the first leading beam) are quantized with 3 bits. The phase values of the remaining 2U−B beams are quantized with 2 bits.

The number of leading beams for which the subband amplitude is reported is given by B=4, 4 or 6 when the total number of configured spatial beams U=2, 3, or 4, respectively.

BRIEF SUMMARY AND SOME DETAILED DESCRIPTION

In view of the drawbacks disclosed earlier, there is provided a communication device or a radio device or a user equipment (UE) and a method therein for providing a channel state information (CSI) feedback in a wireless communication system including at least the UE and a gNB or a radio network node. The UE comprising a processor and a memory, said memory containing instructions executable by said processor whereby said UE is operative by means of e.g. a transceiver to receive from a transmitter (e.g. the gNB or any suitable network node and/or radio communication device) a radio signal via a MIMO channel, where the radio signal contains DL reference signals according to a DL reference signal configuration. The UE is further operative, by means of e.g. the processor to:

estimate the MIMO channel between the gNB and the UE based on the received DL reference signals for the configured resource blocks, calculate, based on a performance metric, a precoder matrix, for a number of antenna ports of the gNB and configured subbands, the precoder matrix being based on two codebooks and a set of combination coefficients for complex scaling/combining one or more of vectors selected from a first codebook and a second codebook, wherein:

the first codebook contains one or more transmit-side spatial beam components of the precoder, and the second codebook contains one or more delay components of the precoder, and the UE is operative to report a CSI feedback and/or a PMI and/or a PMI/RI, used to indicate the precoder matrix for the configured antenna ports and resource blocks.

In accordance with some exemplary embodiments, the first codebook comprises a first DFT- or oversampled DFT-codebook-matrix of size $N_1N_2 \times O_{1,1}N_1O_{1,2}N_2$ containing the spatial beam components ($N_1N_2 \times 1$ vectors) of the precoder matrix. Here, $N_1$ and $N_2$ refer to the number of antenna ports of the same polarization in the first and second dimension of the antenna array, respectively.

In general, for a two-dimensional (2D) antenna array, $N_1$ and $N_2$ are both greater than 1, whereas for a linear (or one-dimensional (1D)) either $N_1$ or $N_2$ is one. The total number of antenna ports for dual-polarized antenna array that may be considered for better understanding is $2N_1N_2$. Furthermore, $O_{1,1} \in \{1, 2, 3, \ldots\}$ and $O_{1,2} \in \{1, 2, 3, \ldots\}$ refer to the oversampling factors of the codebook matrix with respect to the first and second dimension, respectively. The second codebook comprises a second DFT, or discrete cosine transform (DCT-), or oversampled DFT-, or oversampled DCT-codebook matrix of size $N_3 \times N_3O_2$ containing the delay components (represented by $N_3 \times 1$ DFT-/DCT-vectors) of the precoder matrix, where $O_2$ refers to the oversampling factor $O_2=1,2,\ldots$ of the second codebook matrix. Each DFT/DCT vector of the second codebook is associated with a delay (in the transformed domain), as each DFT/DCT vector may model a linear phase increase over the $N_3$ subbands. Therefore, herein we may refer to DFT/DCT vectors of the second codebook in the following as delay vectors or simply delays.

In accordance with some exemplary embodiments, the precoder matrix $F^{(l)}$ of the l-th transmission layer is represented by a three-stage structure $F^{(l)}=F_1^{(l)}F_2^{(l)}F_3^{(l)}$, where $F_1^{(l)}$ contains $U^{(l)}$ selected beam components/beam vectors from the first codebook of the l-th layer for the $2N_1N_2$ antenna ports, $F_3^{(l)}F_2^{(l)}$ contains $D_u^{(l)}$ selected delay vectors from the second codebook of the u-th beam for the configured $N_3$ subbands, where the number of delay vectors $D_u^{(l)}$ per beam may be identical or different over the beams, and $F_3^{(l)}F_2^{(l)}$ contains a number of complex-combining coefficients used to combine the selected $U^{(l)}$ beam vectors and $\Sigma_u D_u^{(l)}$ delay vectors per layer.

The precoder matrix $F^{(l)}=[G_1^{(l)T}\ G_2^{(l)T}]^T$ of the l-th transmission for the configured $2N_1N_2$ antenna ports and $N_3$ subbands may also be represented in a double sum notation for the first polarization of the antenna ports as $$G_1^{(l)} = \alpha^{(l)} \sum_{u=0}^{U^{(l)}-1} b_u^{(l)} \sum_{d=0}^{D_u^{(l)}-1} \gamma_{1,u,d}^{(l)} d_{1,u,d}^{(l)T},$$

and for the second polarization of the antenna ports as $$G_2^{(l)} = \alpha^{(l)} \sum_{u=0}^{U^{(l)}-1} b_u^{(l)} \sum_{d=0}^{D_u^{(l)}-1} \gamma_{2,u,d}^{(l)} d_{2,u,d}^{(l)T},$$

where $b_u^{(l)}$ (u=0, ..., $U^{(l)}$−1) represents the u-th spatial beam vector (contained in matrix $F_1^{(l)}$) selected from the first codebook, $d_{p,u,d}^{(l)}$ (d=0, ..., $D_u^{(l)}$−1) is the delay vector (contained in matrix $F_3^{(l)}$) associated with the u-th beam and p-th polarization selected from the second codebook, $\gamma_{p,u,d}^{(l)}$ is the complex combining coefficient (contained in matrix $F_2^{(l)}$) associated with the u-th beam, d-th delay and p-th polarization, and $\alpha^{(l)}$ is a normalizing scalar.

For brevity, in the following embodiments the delay vectors $d_{1,u,d}^{(l)}$ and $d_{2,u,d}^{(l)}$ are exemplified as identical across two polarizations, such that $d_{u,d}^{(l)}=d_{1,u,d}^{(l)}=d_{2,u,d}^{(l)}$. However, the embodiments herein are not restricted to this example, which means that the embodiments may also be applicable when delay vectors are not identical over both polarizations.

Configuration of the Second Codebook ($N_3$, $O_2N_3$, $O_2$)

In accordance with exemplary embodiments, the UE may be configured to receive from the gNB the higher layer (such as Radio Resource Control (RRC) layer or medium access control-control element (MAC-CE)) or physical layer (Layer 1 or L1) parameter oversampling denoted $N_3$ for the configuration of the second codebook. The specific value of the number of subbands $N_3$ may depend on the maximum expected delay spread of the radio channel and the computational complexity spent at the UE for calculating the combining coefficients of the precoder matrix. Therefore, the specific value of $N_3$ may depend on parameters related to or associated with the radio channel (such as the channel delay spread) and different design aspects of the precoder. In one example, the value of $N_3$ may be identical to the number of configured channel Quality Indicator (CQI) subbands (low computational complexity approach). In another example, the value of $N_3$ may be identical to the number of configured PRBs (high computational complexity approach), although not necessary for the functioning of the embodiments herein.

In accordance with some exemplary embodiments, the value of $N_3$ may be defined by/as the total number of subbands with subband size $N_{PRB}$, wherein PRB stands for physical resource block, where $N_{PRB}$ denotes the number of PRBs per subband. The value of $N_{PRB}$ may depend on the parameters of a orthogonal frequency division multiplexing (OFDM) transmission signal such as a configured subcarrier spacing (SCS) and a channel delay spread of the channel. Two exemplary values for $N_{PRB}$ are 4 and 2 for 15 KHz and 30 KHz SCSs, respectively.

In accordance with some exemplary embodiments, the UE may be configured or operative to receive from the gNB a higher layer (RRC or MAC-CE) or physical layer (L1) parameter oversampling factor $O_2$ for the configuration of the second codebook. The oversampling factor defines the grid size of the delay components of the precoder. A large oversampling factor may result in a very fine grid for the delay components of the precoder and enhanced performance, but it also increases the codebook size and the computational complexity for selecting the delay components of the precoder.

In accordance with some exemplary embodiments, the UE is configured or is operative to select the oversampling factor used for the configuration of the second codebook and signal to the gNB by higher layer (RRC or MAC-CE) or physical layer (L1) the oversampling factor $O_2$.

In accordance with some exemplary embodiments, the UE is configured or is operative to use an a priori known (default) oversampling factor(s) $O_2$ for the configuration of the second codebook. In such a case, the oversampling factor may depend on the total number of configured PRBs (e.g. the total system bandwidth), where a higher oversampling factor (e.g., $O_2=8$ or $O_2=16$) may be applied when the total number of PRBs is larger than a specific pre-determined value and a lower oversampling factor (e.g., $O_2=4$, $O_2=2$ or $O_1=1$) otherwise.

In accordance with some exemplary embodiments, the UE may be configured or may be operative to signal its capability with respect to the oversampling factor of the second codebook. For example, a UE with a limited computational power may not support oversampling of the second codebook, and may signal $O_2=1$. Hence, signaling UE capabilities may be advantageous in case the UE has limited computational power or capacity or CPU power.

In accordance with some exemplary embodiments, the UE may be configured or may be operative to signal its capability with respect to the total number of subbands $N_3$ for configuration of the second codebook. For example, a UE with a limited computational power may not support high values for $N_3$, and may indicate it by signaling a parameter (e.g, R=1) to the gNB. In the other case, a UE with a larger computational power may support high values for $N_3$, and may indicate it by signaling a parameter (e.g, R=2) to the gNB. Hence, signaling UE capabilities may be advantageous in case the UE has limited computational power or capacity or CPU power.

Hence, the method performed by the UE includes signaling capability of the UE with respect to the total number of subbands $N_3$ for configuration of the second codebook.

Beam Configuration and Reporting of Selected Beam Indices

In accordance with some exemplary embodiments, the UE is configured to or is operative to receive from the gNB a higher layer (RRC or MAC-CE) or physical layer (L1) parameter $U^{(l)}$, representing the number of spatial beams for the l-th transmission layer. The number of spatial beams $U^{(l)}$ and the selected spatial beam vectors from the first codebook are typically different for each transmission layer. However, the reporting of different spatial beam vectors for each transmission layer may result in a high feedback overhead. In order to reduce the feedback overhead in accordance with embodiments herein, the UE may be configured to or may be operative to select identical beam vectors from the first codebook for a subset of the transmission layers which is advantageous. For example, the UE may be configured to or be operative to select identical spatial beam vectors for the first and second transmission layers and different (but possibly identical) spatial beam vectors for the third and fourth transmission layers.

Delay Configuration and Reporting of Selected Delay Vectors

The configured $U^{(l)}$ beam vectors and the $D_u^{(l)}$ delay vectors per beam of the precoder matrix are aligned with the multipath components of the MIMO propagation channel. The multipath components of the radio channel generally occur in the form of multipath clusters, where a multipath cluster may be understood as a group of multipath components with similar channel propagation parameters such as angle-of-arrival, angle-of-departure and delay [3]. Depending on the cluster distribution in the spatial and delay domains of the radio channel, each beam vector of the precoder matrix may be associated with a single cluster or few clusters, where each cluster may have a different delay. Some of the beam vectors of the precoder matrix shall therefore be associated with a small number of delays/delay vectors and some of the beam vectors shall be associated with a large number of delays/delay vectors.

In accordance with some exemplary embodiments, the UE may be configured with a different number of delays $D_u^{(l)}$ per beam vector, or with subsets of beam vectors having an identical number of delays and with a different number of delays per subset. The number of configured delays may increase (decrease) with a beam or subgroup beam index. The selected delay vectors by the UE may be non-identical, partially identical, or fully identical over the beam indices and/or layer indices. Hence, the embodiments herein are not restricted to any specific delay vectors.

There is also provided a method performed by the UE as previously described. The method includes:
estimating the MIMO channel (as previously described) between the gNB and the UE based on the received DL reference signals for the configured resource blocks,
calculating, based on a performance metric, a precoder matrix, for a number of antenna ports of the gNB and configured subbands, the precoder matrix being based on two codebooks and a set of combination coefficients for complex scaling/combining one or more of vectors selected from a first codebook and a second codebook, wherein:

the first codebook contains one or more transmit-side spatial beam components of the precoder, and the second codebook contains one or more delay components of the precoder, and the UE reporting, to the gNB, a CSI feedback and/or a PMI and/or a PMI/RI, used to indicate the precoder matrix for the configured antenna ports and resource blocks.

According to an exemplary embodiment, the method further comprises receiving from the gNB the higher layer (such as Radio Resource Control (RRC) layer or medium access control-control element (MAC-CE)) or physical layer (Layer 1 or L1) parameter oversampling denoted $N_3$ for the configuration of the second codebook.

According to another exemplary embodiment, the method further comprises receiving from the gNB a higher layer (RRC or MAC-CE) or physical layer (L1) parameter oversampling factor $O_2$ for the configuration of the second codebook.

Beam Configuration and Reporting of Selected Beam Indices

In accordance with some exemplary embodiments, the method may further comprises receiving from the gNB a higher layer (RRC or MAC-CE) or physical layer (L1) parameter $U^{(l)}$, representing the number of spatial beams for the l-th transmission layer. The number of spatial beams $U^{(l)}$ and the selected spatial beam vectors from the first codebook are typically different for each transmission layer. However, the reporting of different spatial beam vectors for each transmission layer may result in a high feedback overhead. In order to reduce the feedback overhead in accordance with embodiments herein, the method comprises selecting identical beam vectors from the first codebook for a subset of the transmission layers which is advantageous. For example, for the UE, the method may be configured to select identical spatial beam vectors for the first and second transmission layers and different (but possibly identical) spatial beam vectors for the third and fourth transmission layers.

Delay Configuration and Reporting of Selected Delay Vectors

The configured $U^{(l)}$ beam vectors and the $D_u^{(l)}$ delay vectors per beam of the precoder matrix are aligned with the multipath components of the MIMO propagation channel. The multipath components of the radio channel generally occur in the form of multipath clusters, where a multipath cluster may be understood as a group of multipath components with similar channel propagation parameters such as angle-of-arrival, angle-of-departure and delay [3]. Depending on the cluster distribution in the spatial and delay domains of the radio channel, each beam vector of the precoder matrix may be associated with a single cluster or few clusters, where each cluster may have a different delay. Some of the beam vectors of the precoder matrix shall therefore be associated with a small number of delays/delay vectors and some of the beam vectors shall be associated with a large number of delays/delay vectors.

In accordance with some exemplary embodiments, the method performed by the UE may include that the UE be configured with a different number of delays $D_u^{(l)}$ per beam vector, or with subsets of beam vectors having an identical number of delays and with a different number of delays per subset. The number of configured delays may increase (decrease) with a beam or subgroup beam index. The selected delay vectors by the UE may be non-identical, partially identical, or fully identical over the beam indices and/or layer indices. Hence, the embodiments herein are not restricted to any specific delay vectors.

There is also provided a computer program comprising instructions which when executed on at least one processor of the UE according to the method related or associated with the UE described above, cause the at least said one processor to carry out the method according to anyone of the method subject-matter disclosed earlier. A carrier is also provided containing the computer program wherein the carrier is one of a computer readable storage medium; an electronic signal, optical signal or a radio signal.

There is also provided a method performed by the gNB or a radio network node or a radio base station and a radio network node or a gNB. The gNB is configured to perform at least the steps disclosed earlier. The method performed by the gNB includes in method terms, what has been defined as "configured to. As an example, the method in the gNB may include receiving from the UE a CSI feedback and/or a PMI and/or a PMI/RI, used to indicate the precoder matrix for the configured antenna ports and resource blocks.

According to an exemplary embodiment, the method, by the gNb may include transmitting to the UE a higher layer (such as Radio Resource Control (RRC) layer or medium access control-control element (MAC-CE)) or physical layer (Layer 1 or L1) parameter oversampling denoted $N_3$ for the configuration of the second codebook.

According to another exemplary embodiment, the method further comprises transmitting to the UE a higher layer (RRC or MAC-CE) or physical layer (L1) parameter oversampling factor $O_2$ for the configuration of the second codebook.

Beam Configuration and Reporting of Selected Beam Indices

In accordance with some exemplary embodiments, the method may further comprises transmitting to the UE a higher layer (RRC or MAC-CE) or physical layer (L1) parameter $U^{(l)}$, representing the number of spatial beams for the l-th transmission layer. The number of spatial beams $U^{(l)}$ and the selected spatial beam vectors from the first codebook are typically different for each transmission layer. However, the reporting of different spatial beam vectors for each transmission layer may result in a high feedback overhead. In order to reduce the feedback overhead in accordance with embodiments herein, the method comprises selecting identical beam vectors from the first codebook for a subset of the transmission layers which is advantageous. For example, for the UE, the method may be configured to select identical spatial beam vectors for the first and second transmission layers and different (but possibly identical) spatial beam vectors for the third and fourth transmission layers.

Delay Configuration and Reporting of Selected Delay Vectors

The configured $U^{(l)}$ beam vectors and the $D_u^{(l)}$ delay vectors per beam of the precoder matrix are aligned with the multipath components of the MIMO propagation channel. The multipath components of the radio channel generally occur in the form of multipath clusters, where a multipath cluster may be understood as a group of multipath components with similar channel propagation parameters such as angle-of-arrival, angle-of-departure and delay [3]. Depending on the cluster distribution in the spatial and delay domains of the radio channel, each beam vector of the precoder matrix may be associated with a single cluster or few clusters, where each cluster may have a different delay. Some of the beam vectors of the precoder matrix shall therefore be associated with a small number of delays/delay vectors and some of the beam vectors shall be associated with a large number of delays/delay vectors.

In accordance with some exemplary embodiments, the method performed by the gNB may include configuring the UE with a different number of delays $D_u^{(l)}$ per beam vector, or with subsets of beam vectors having an identical number of delays and with a different number of delays per subset. The number of configured delays may increase (decrease) with a beam or subgroup beam index. The selected delay vectors by the UE may be non-identical, partially identical, or fully identical over the beam indices and/or layer indices. Hence, the embodiments herein are not restricted to any specific delay vectors.

According to another aspect of embodiments herein, there is also provided a radio base station or gNB, the radio base station comprising a processor and a memory, said memory containing instructions executable by said processor whereby said gNB is operative to perform any one of the subject-matter of method steps described above.

There is also provided a computer program comprising instructions which when executed on at least one processor of the gNB according to the method related or associated with the gNB described above, cause the at least said one processor to carry out the method according to anyone of the method subject-matter disclosed earlier. A carrier is also provided containing the computer program wherein the carrier is one of a computer readable storage medium; an electronic signal, optical signal or a radio signal.

BRIEF DESCRIPTION OF THE DRAWINGS

Examples of embodiments and advantages of the embodiments herein are described in more detail with reference to attached drawings in which:

FIGS. 1-4 depict several examples of delay configurations for the precoder matrix of a layer with different computational complexities and feedback overheads for selecting and reporting the delay vectors per beam are provided.

FIGS. 5-12 depicts examples of the number of feedback bits for amplitude reporting according to some exemplary embodiments herein

FIG. 20 depicts unequal distribution of amplitude values of non-linear amplitude set A for N=4.

FIG. 21 shows equal distribution of amplitude values over entire range of '0' to '1' of the linear amplitude set A for N=4.

FIG. 22 depicts comparison of the distribution of the amplitude values from non-linear and linear amplitude sets for N=4.

DETAILED DESCRIPTION

Figure 13:
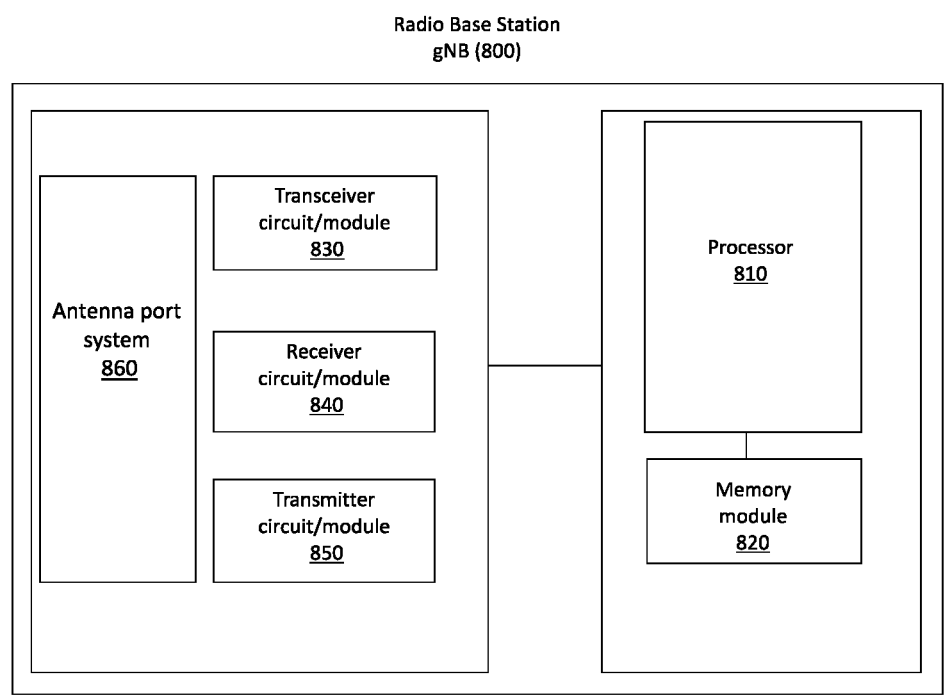
FIG. 13 is an exemplary block diagram depicting a radio base station or gNB or network node according to exemplary embodiments herein.

In order to perform the previously described process or method steps related to the radio network node (e.g. a radio base station or gNB), some embodiments herein include a network node for receiving feedback from a UE as previously described. As shown in FIG. 13, the network node or radio base station or gNB 800 comprises a processor 810 or processing circuit or a processing module or a processor or means 810; a receiver circuit or receiver module 840; a transmitter circuit or transmitter module 850; a memory module 820 a transceiver circuit or transceiver module 830 which may include the transmitter circuit 850 and the receiver circuit 840. The network node 800 further comprises an antenna system 860 which includes antenna circuitry for transmitting and receiving signals to/from at least the UE. The antenna system employs beamforming as previously described.

The network node 500 may belong to any radio access technology including 2G, 3G, 4G or LTE, LTE-A, 5G, WLAN, and WiMax etc. that support beamforming technology.

The processing module/circuit 810 includes a processor, microprocessor, an application specific integrated circuit (ASIC), field programmable gate array (FPGA), or the like, and may be referred to as the "processor 810." The processor 810 controls the operation of the network node 800 and its components. Memory (circuit or module) 820 includes a random access memory (RAM), a read only memory (ROM), and/or another type of memory to store data and instructions that may be used by processor 810. In general, it will be understood that the network node 800 in one or more embodiments includes fixed or programmed circuitry that is configured to carry out the operations in any of the embodiments disclosed herein.

In at least one such example, the network node 800 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed herein including anyone of method steps already described. Further, it will be appreciated that the network node 800 may comprise additional components not shown in FIG. 13.

Details on the functions and operations performed by the network node have already been described and need not be repeated again.

In order to perform the previously described process or method steps related to the UE or communication device or radio device, some embodiments herein include a UE for providing efficient feedback reporting for at least a New Radio-(NR) based wireless communication network system, which feedback includes Channel State Information (CSI).

Figure 14:
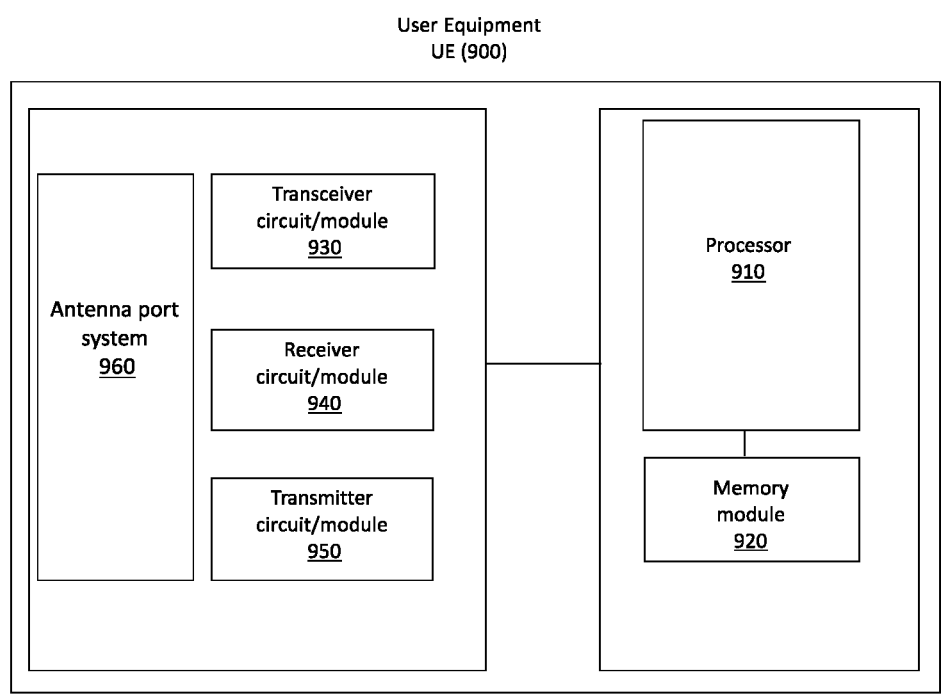
FIG. 14 is a block diagram depicting a UE or communication device or radio device according to exemplary embodiments herein.

As shown in FIG. 14, the UE 900 comprises a processor 910 or processing circuit or a processing module or a processor or means 910; a receiver circuit or receiver module 940; a transmitter circuit or transmitter module 950;

a memory module 920 a transceiver circuit or transceiver module 930 which may include the transmitter circuit 950 and the receiver circuit 840. The UE 900 further comprises an antenna system 960 which includes antenna circuitry for transmitting and receiving signals to/from at least the UE. The antenna system employs beamforming as previously described.

The network node 500 may belong to any radio access technology including 2G, 3G, 4G or LTE, LTE-A, 5G, WLAN, and WiMax etc. that support beamforming technology.

The processing module/circuit 910 includes a processor, microprocessor, an application specific integrated circuit (ASIC), field programmable gate array (FPGA), or the like, and may be referred to as the "processor 910." The processor 910 controls the operation of the network node 900 and its components. Memory (circuit or module) 920 includes a random access memory (RAM), a read only memory (ROM), and/or another type of memory to store data and instructions that may be used by processor 910. In general, it will be understood that the UE 900 in one or more embodiments includes fixed or programmed circuitry that is configured to carry out the operations in any of the embodiments disclosed herein.

In at least one such example, the UE 900 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed herein including anyone of method steps already described. Further, it will be appreciated that the UE 900 may comprise additional components not shown in FIG. 14.

Details on the functions and operations performed by the UE have already been described and need not be repeated again.

In the following, several examples of delay configurations for the precoder matrix of a layer with different computational complexities and feedback overheads for selecting and reporting the delay vectors per beam are provided. FIGS. 1-4 show different example of delay configurations. It is worth noting that these figures depicts only some examples and the embodiments are not restricted to these in any way. In the following "configured to" and "operative to" or "adapted to" may be used interchangeably.

In one example, the UE is configured with $D_0^{(l)}$ for the first beam leading beam) and $D_{U-1}^{(l)}=U$ for the (U−1)-th beam and the number of delays/delay vectors may increase with the beam index.

In one example, the UE is configured with $D_0^{(l)}=1$ for the first beam (leading beam) and $D_{U-1}^{(l)}=U$ for the (U−1)-th beam and the number of delays/delay vectors may increase with the beam index.

In another example, the UE is configured with $D_0^{(l)}=1$ for the first beam (leading beam) and $D_{U-1}^{(l)}=N$ for the (U−1)-th beam and the number of delays/delay vectors may increase with the beam index.

In another example, the UE is configured with $D_0^{(l)}=N_1$ delays/delay vectors for the first beam (leading beam) and $D_{U-1}^{(l)}=N_2$ delays/delay vectors for the (U−1)-th beam and the number of delays/delay vectors may increase with the beam index.

In another example, the UE is configured with a single delay/delay vector for the first beam (leading beam), $N_1$ delays/delay vectors for the second beam and $N_2$ delays/delay vectors for the (U−1)-th beam and the number of delays/delay vectors may increase with the beam index.

In another example, the UE is configured with an identical number of delays/delay vectors $D_0^{(l)}= \ldots =D_{U-1}^{(l)}$ for all beams.

In another example, the UE is configured with a single delay/delay vector for the first beam (leading beam) and $D_1^{(l)}= \ldots =D_{U-1}^{(l)}$ delays/delay vectors for the remaining beams.

(a) Reporting of Delay Vectors

In accordance with embodiments, the UE may report for each beam or for each beam group a delay indicator for the $D_u^{(l)}$ delay vectors selected from the second codebook to the gNB. The delay indicator may refer to a set of indices where each index is associated with a delay vector from the second codebook.

In accordance with embodiments, to reduce the feedback overhead for reporting the multiple delay indicators, the UE is configured to select for each beam the delay vectors from a "common" set of non-identical delay vectors and to report only a single delay indicator. The number of delay vectors in the common set is not greater than $\max[D_u^{(l)}] \forall u$. The UE may therefore report only a single delay indicator instead of multiple delay indicators where the single delay indicator refers to the indices of the delay vectors from the common set. The delay vectors associated with the u-th beam are identical with a subset of the delay vectors associated with the (u+1)-th (or (u−1)-th) beam, such that $d_{u,d}^{(l)}=d_{w,d}^{(l)}=d_d^{(l)}$, $\forall u' \geq u$ (or $\forall u' \leq u$). For example, the delay vectors associated with the i-th beam may be identical with a subset of the delay vectors associated with the (i+n)-th beam (n≥1). The UE then reports only the $D_{U-1}^{(l)}$ indices associated with the delay vectors of the (U−1)-th beam to the gNB.

In accordance with embodiments, the UE may be configured to report the indices of the selected delay vectors from the common set in a sorted way such that the gNB may associate the selected delay vectors from the common set to each beam. The information on the sorting is either known or reported to the gNB. In one example, the UE may sort the delay indices with respect to the power/amplitude of the associated combining coefficients over the beams in a decreasing order. The first index in the report may then correspond to the strongest delay (i.e., the delay associated with the combining coefficients having the highest power/amplitude).

Examples of some delay configurations and reporting of the single delay indicator are shown in FIG. 1 to FIG. 4.

In accordance with embodiments, the UE may be configured not to report the single delay indicator or multiple delay indicators to the gNB. In such a case, the UE and gNB know a priori the set of delay vectors from the second codebook.

In accordance with embodiments, the UE is configured to report the delay indicator for the selected delay vectors from the second codebook. The DFT/DCT delay vectors in the codebook may be grouped into $O_2$ orthogonal subgroups/submatrices, where each DFT/DCT delay vector in a subgroup may be associated with an index. For example, when there $O_2 N_3$ delay vectors in the second codebook, there are $O_2$ subgroups/submatrices, where the first delay vector in a subgroup/submatrix may be associated with a first index ("0"), second delay vector is associated with a second index ("1"), and the last delay vector is associated with the index ("$N_3$-1"). In order to reduce the computational complexity for selecting T delay DFT/DCT vectors, the UE may be configured to select T delay vectors out of a subgroup of $O_2$ subgroups/submatrices from the second codebook. When reporting the indices of the T selected DFT/DCT delay vectors, the UE may then report the group index (0, 1, . . . , $O_2$-1) and the associated indices for the selected T delay vectors within the selected subgroup. Therefore, for reporting the selected delay vectors and subgroup index, $T\lceil\log_2(N_3)\rceil+\log_2(O_2)$ feedback bits are required.

In accordance with embodiments, when the number of delay vectors to be reported is large compared to the subgroup size ($N_3$), it is beneficial to associate each delay vector in a subgroup directly with a single bit of an $N_3$-length bitmap and to report the bitmap instead of reporting the indices of the delay vectors. The number of feedback bits then accounts to $N_3$ bits for reporting the bitmap and $\log_2(O_2)$ bits for the subgroup indication.

In accordance with embodiments, the UE is configured to report the group index (0, 1, . . . , $O_2$-1), e.g., by higher layer (RRC) and not to report the indices of the T selected DFT/DCT delay vectors.

In accordance with embodiments, the UE is configured to the report the indices of the T selected DFT/DCT delay vectors, e.g., by higher layer (RRC) and not to report the group index.

In accordance with some exemplary embodiments, in addition to the report of the delay indicator (if reported), the UE may indicate the selected delay vectors associated with the non-zero combining coefficients per beam, or K selected combining coefficients (corresponding to the coefficients with the highest amplitude/power) for the 2U beams in the report. In such a case, the delay vectors of each beam are associated with a $D_u^{(l)}$-length bitmap, where $D_u^{(l)}$ is the number of configured delay vectors of the u-th beam. Each bit in the bitmap is associated with a single delay of the $\max[D_u^{(l)}]$, $\forall u$ common delay vectors. For example, the first bit may be associated with the first common delay vector, the second bit with the second common delay vector and so on. The UE report then contains for the u-th beam a length-$D_u^{(l)}$ bitmap for indicating the selected delay vectors associated with the non-zero combining coefficients or the K selected combining coefficients. When a delay/delay vector is common to all beams and is associated with only zero-valued combining coefficients, the corresponding combining coefficients are not reported and not indicated by the bitmap. The corresponding index is removed from the delay indicator reported to the gNB. Similarly, when a beam vector is only associated with zero-valued combining coefficients, the corresponding combining coefficients are not reported and not indicated by the bitmap. For example, when the u-th beam is only associated with zero-valued combining coefficients, the $D_u^{(l)}$-length bitmap associated with the u-th beam and the corresponding combining coefficients are not reported.

(b) Configuration of Parameters $D_u^{(l)}$

In accordance with embodiments, the UE is configured to receive from the gNB the higher layer (RRC or MAC-CE) or physical layer parameters $D_u^{(l)}$ for the U beams and L transmission layers, where the number of delay vectors $D_u^{(l)}$ may be different, identical or partially identical over the beams. When the number of delays may increase (decrease) with the beam or subgroup beam index in a known manner, it is sufficient to signal only a subset of the parameters $D_u^{(l)}$ or none of the parameters $D_u^{(l)}$ for the delay configuration of the precoder matrix.

For example, when the UE is configured with $D_0^{(l)}=1$ for the first beam (leading beam) and $D_{U-1}^{(l)}=U$ for the (U−1)-th beam, the gNB may not signal the parameters $D_u^{(l)}$.

For example, when the UE is configured with $D_0^{(l)}=1$ for the first beam (leading beam) and $D_{U-1}^{(l)}=N$ for the (U−1)-th beam, the gNB may signal the single parameter $D_{U-1}^{(l)}$ for the delay configuration of the precoder matrix.

For example, when the UE is configured with $D_0^{(l)}=N_1$ for the first beam (leading beam) and $D_{U-1}^{(l)}=N_2$ for the (U−1)-th beam, the gNB may signal the two parameters $D_0^{(l)}$ and $D_{U-1}^{(l)}$ for the delay configuration of the precoder matrix.

For example, when the UE is configured with a single delay for the first beam (leading beam), $N_1$ delays for the second beam and $N_2$ delays for the (U−1)-th beam, the gNB may signal the two parameters $D_1^{(l)}$ and $D_{U-1}^{(l)}$ for the delay configuration of the precoder matrix.

For example, when the UE is configured with an identical number of delays $D^{(l)}$ for all or a subset of beams, the gNB may signal the single parameter $D^{(l)}$ for the delay configuration of the precoder matrix.

In accordance with embodiments, the UE is configured to select and to report the parameters $D_u^{(l)}$ for the U beams and L transmission layers to the gNB. When the number of delays may increase (decrease) with the beam or subgroup beam index in a known manner, it is sufficient to report only a subset of the parameters $D_u^{(l)}$ or none of the parameters $D_u^{(l)}$ for the delay configuration of the precoder matrix.

In accordance with embodiments, the UE is configured to use a priori known parameters $D_u^{(l)}$ for the delay configuration of the precoder matrix.

(c) Non-Reporting of the First Delay Vector Associated with the Leading Beam

In accordance with embodiments, the UE is configured with at least one delay vector for the leading beam where the first delay vector for the leading beam is identical to the first delay vector from the selected subgroup/submatrix out of the O2 subgroups/submatrices from the second codebook. The leading beam is associated with the strongest combining coefficient (which corresponds to the coefficient having the largest power/amplitude over all combining coefficients).

In accordance with embodiments, the UE is configured not to report the index associated with the first delay vector of the leading beam. This means, the UE is configured to remove the index associated with the first delay vector of the leading beam from the delay indicator, i.e., the index associated with the first delay vector associated with the leading beam is not reported.

In accordance with embodiments, the UE is configured to normalize the selected delays vectors with respect to a single reference delay vector. This means, the corresponding delays in the time/delay domain of the delay vectors are subtracted from a single reference delay. The reference delay vector may be identical with the first delay vector of the leading beam. The reference delay vector is known at the gNB and hence the associated delay index is not reported to the gNB.

Codebook Subset Restriction

In accordance with some exemplary embodiments, the UE is configured to select the delays/delay vectors per beam and layer from a subset of the delay vectors from the second codebook. The number of delay vectors and the specific delay vectors in the subset are associated with the delay values of the MIMO channel impulse response(s) (CIR(s)) between the UE and gNB. For example, when the average delay spread of the MIMO channel is small (which is typically observed in Line-of-sight (LOS) channel(s)), the energy of the channel impulse response is concentrated in a single main peak and only a few dominant delays are associated with the main peak. In such a case, the UE selects only few delay vectors from a second codebook, where the corresponding delays of the selected delay vectors are associated with the dominant channel delays of the MIMO CIR. In contrast, when the average delay spread of the channel impulse response is large (as observed in Non-Line-of-sight (NLOS) channel(s)), the energy of the channel impulse response is concentrated in a one or more peaks and a larger number of dominant channel delays is associated with the peak(s) of the CIR. Then, the UE selects a larger number of delay vectors from the second codebook. Therefore, for typical MIMO channel settings, the selected delay vectors by the UE are mainly associated with a subset of the delay vectors from the second codebook. Therefore, the size of the second codebook may be reduced, and thus the computational complexity for selecting the delay vectors by the UE.

In one example, the UE is configured to select the delay vectors from a subset of the second codebook where the subset is defined by the first $Z_1$ vectors and the last $Z_2$ vectors of a DFT matrix.

In one example, the UE is configured to select the delay vectors from multiple subsets of the second codebook. The DFT/DCT delay vectors in the codebook may be grouped into $O_2$ orthogonal subgroups/submatrices, where each DFT/DCT delay vector in a subgroup may be associated with an index. For example, when there $O_2N_3$ delay vectors in the second codebook, there are $O_2$ subgroups/submatrices, where the first delay vector in a subgroup/submatrix may be associated with a first index ("0"), second delay vector is associated with a second index ("1"), and the last delay vector is associated with the index ("$N_3-1$"). For each orthogonal subgroup, the UE is configured to select the delay vectors from a subset of orthogonal DFT vectors from the subgroup. In one instance, the subset associated with a subgroup may be defined by the first Z delay vectors of the subgroup. In another instance, the subset associated with a subgroup may be defined by the first $Z_1$ delay vectors and the last delay $Z_2$ vectors of the orthogonal delay vectors of the subgroup. In another instance, the subset associated with a subgroup may also be defined by the $i_1:i_2$ orthogonal delay vectors in the subgroup. In another instance, the subset associated with a subgroup may also be defined by the $i_1:i_2$ orthogonal delay vectors and the $i_3:i_4$ orthogonal delay vectors in the subgroup.

In accordance with embodiments, the UE is either configured by the gNB with a subset of delay vectors from the second codebook by higher layer (such as Radio Resource Control (RRC) layer or MAC-CE) or physical layer, or with a priori known (default) subset(s) of delay vectors from the second codebook, or to report the selected subset(s) of delay vectors to the gNB.

In accordance with embodiments, the UE is configured by the gNB with the higher layer (such as Radio Resource Control (RRC) layer or MAC-CE) or physical layer parameter(s) Z or $Z_1$ and $Z_2$ that indicate the subset of delay vectors (from a subgroup of $O_2$ orthogonal subgroups/submatrices) from the second codebook, or with a priori known (default) parameter(s) Z or $Z_1$ and $Z_2$ that indicate the subset of delay vectors (from a subgroup of $O_2$ orthogonal subgroups/submatrices) from the second codebook, or to report parameter(s) Z or $Z_1$ and $Z_2$ that indicate the selected subset of delay vectors (from a subgroup of $O_2$ orthogonal subgroups/submatrices) from the second codebook.

In accordance with some exemplary embodiments, the UE is configured to report a bitmap to indicate the selected delay vectors of the subset from the second codebook. The length of the bitmap is given by the size of the subset. A "1" in the bitmap may indicate that the corresponding delay vector of the subset is selected, and a "0" in the bitmap may indicate that the corresponding delay vector is not selected.

In accordance with embodiments, the UE may be configured to select the delay vectors for one layer or a for set of layers from one subgroup out of the $O_2$ orthogonal subgroups/submatrices from the second codebook and for others layers from a different subgroup out of the $O_2$ orthogonal subgroups/submatrices from the second codebook.

In accordance with embodiments, to reduce the interferences between different transmission layers, the UE may be configured to select a first set of delay vectors for one layer or for a set of layers from one subgroup out of the $O_2$ orthogonal subgroups/submatrices from the second codebook and for other layers a second set of delay vectors from the same subgroup, where the first and second set of delay vectors are orthogonal to each other.

In accordance with embodiments, to reduce the interferences between different transmission layers, the UE is configured to select a first set of delay vectors for a first set of layer(s) from one subgroup out of the $O_2$ orthogonal subgroups/submatrices from the second codebook and for a different second set of layer(s) a second set of delay vectors from the same subgroup, where the first and second set of delay vectors are partially orthogonal to each other. In one example, the UE is configured to select N delay vectors for the first set of layer(s) and M delay vectors for the second set of layer(s) and out of two sets of selected delay vectors at least G delay vectors are orthogonal to each other. In another example, the UE is configured to select an identical number of delay vectors for both sets of layers and at least G delay vectors are orthogonal to each other. The parameter G may be configured by the gNB, or reported by the UE, or fixed and known at the UE.

In accordance with embodiments, to reduce the feedback overhead for reporting the delay indicator for a layer or a set of layers, the UE is configured to select N delay vectors from the second codebook, where N' out of N delay vectors are fixed and a priori known at the UE. The delay indicator reported to the gNB then refers only to (N−N') indices instead of N indices that correspond to the selected non-fixed delay vectors by the UE. When N=N', the UE uses a known set of delay vectors for the precoder matrix and the delay indicator is not reported to the gNB.

Quantization and Reporting of Complex Combining Coefficients

For the quantization and reporting of the $D_u^{(l)}$ combining coefficients per beam of the precoder matrix, four bit allocation schemes to report the amplitude and relative phase of the combining coefficients $\gamma_{p,i,j}^{(l)}$ may be presented according to the following.

In a first scheme of amplitude/phase quantization and reporting of the combining coefficients, each combining coefficient $\gamma_{p,i,j}^{(l)}$ is written as a product of two coefficients $b_{l,p,i,j}$ and $d_{l,p,i,j}$, $$\gamma_{p,i,j}^{(l)} = b_{l,p,i,j} d_{l,p,i,j},$$

where $b_{l,p,i,j}$ is the amplitude of $\gamma_{p,i,j}^{(l)}$, and $$d_{l,p,i,j} = \exp\left(\frac{j2\pi n}{2^N}\right); n \in \{0, 1, \ldots, 2^N - 1\}, N \in \{1, 2, 3, 4\}$$

is a complex-valued unit-magnitude coefficient to indicate the phase of $\gamma_{p,i,j}^{(l)}$.

In a second scheme of amplitude/phase quantization and reporting of the combining coefficients, each combining coefficient $\gamma_{p,i,j}^{(l)}$ is written as a product of three coefficients $a_{l,p,i}$, $b_{l,p,i,j}$ and $d_{l,p,i,j}$, $$\gamma_{p,i,j}^{(l)} = a_{l,p,i} b_{l,p,i,j} d_{l,p,i,j},$$

where $a_{l,p,i}$ is a real-valued coefficient representing a common amplitude across all combining coefficients associated with the i-th beam, p-th polarization and l-th layer, $b_{l,p,i,j}$ is a real-valued normalized combining-coefficient representing the amplitude associated with the i-th beam, j-th delay vector, p-th polarization and l-th layer, and $$d_{l,p,i,j} = \exp\left(\frac{j2\pi n}{2^N}\right); n \in \{0, 1, \ldots, 2^N - 1\}, N \in \{1, 2, 3, 4\}$$

is a coefficient to indicate the phase of $\gamma_{p,i,j}^{(l)}$.

In a third scheme of amplitude and phase quantization and reporting, each combining coefficient $\gamma_{p,i,j}^{(l)}$ is written as a product of three coefficients $c_{l,p,j}$, $b_{l,p,i,j}$ and $d_{l,p,i,j}$, $$\gamma_{p,i,j}^{(l)} = c_{l,p,j} b_{l,p,i,j} d_{l,p,i,j},$$

where $b_{l,p,i,j}$ is a real-valued normalized combining-coefficient representing the amplitude associated with the i-th beam, j-th delay vector, p-th polarization and l-th layer, and $$d_{l,p,i,j} = \exp\left(\frac{j2\pi n}{2^N}\right); n \in \{0, 1, \ldots, 2^N - 1\}, N \in \{1, 2, 3, 4\}$$

is a coefficient to indicate the phase of $\gamma_{p,i,j}^{(l)}$. The coefficient $c_{l,p,j}$ is a real-valued coefficient representing a common amplitude across all combining coefficients associated with the j-th delay vector and l-th layer and may be polarization-dependent or not. In the case that $c_{l,p,j}$ is polarization-dependent, $c_{l,p,j}$ represents a common amplitude across all combining coefficients associated with the j-th delay vector, l-th layer and p-th polarization. In the case $c_{l,p,j}$ is polarization-independent, $c_{l,p,j}$ represents a common amplitude across all combining coefficients for both polarizations associated with the j-th delay vector and l-th layer, i.e., $c_{l,1,j} = c_{l,2,j}$, $\forall j$.

In a fourth scheme of amplitude and phase quantization and reporting, each combining coefficient $\gamma_{p,i,j}^{(l)}$ is written as a product of four coefficients $a_{l,p,i}$, $c_{l,p,j}$, $b_{l,p,i,j}$, and $d_{l,p,i,j}$, $$\gamma_{p,i,j}^{(l)} = a_{l,p,i} c_{l,p,j} b_{l,p,i,j} d_{l,p,i,j},$$

where $b_{l,p,i,j}$ is a real-valued normalized combining-coefficient representing the amplitude associated with the i-th beam, j-th delay vector, p-th polarization and l-th layer, $a_{l,p,i}$ is a real-valued coefficient representing a common amplitude across all combining coefficients associated with the i-th beam, p-th polarization and l-th layer, and $c_{l,p,j}$ is a polarization-dependent or polarization-independent real-valued coefficient representing a common amplitude across all combining coefficients associated with the j-th delay vector and l-th layer, and $$d_{l,p,i,j} = \exp\left(\frac{j2\pi n}{2^N}\right); n \in \{0, 1, \ldots, 2^N - 1\}, N \in \{1, 2, 3, 4\}$$

is a coefficient to indicate the phase of $\gamma_{p,i,j}^{(l)}$. $a_{l,p,i}$, $b_{l,p,i,j}$, $c_{l,p,j}$ are referred to as amplitudes or power of the combining coefficients, and $d_{l,p,i,j}$ is referred to as phase of the combining coefficient.

In accordance with embodiments, the UE may be configured to represent the combining coefficients or only a set of the combining coefficients either by scheme 1, scheme 2, scheme 3, or scheme 4. The schemes may also be combined for representing the combining coefficients such that for one part of the combining coefficients one scheme is used and for another part of the combining coefficients another scheme is used.

In accordance with embodiments, to reduce the feedback overhead for reporting the combining coefficients, the UE may be configured to select one quantization scheme out of the above quantization schemes and to quantize and report the combining coefficients using the selected scheme. In one example, the UE is configured to select the quantization scheme out of the schemes 2 and 3. When the number of reported spatial beam indices is greater than the reported number of indices of the delays/delay vectors, scheme 2 is used for quantization and reporting of the combining coefficients. On the other hand, when the number of reported spatial beams is smaller than the reported number of indices of the delays/delay vectors, scheme 3 is used for the quantization and reporting of the combining coefficients.

In accordance with embodiments, the UE may be configured to receive the quantization parameter for selecting the quantization (e.g., scheme 2 or 3) of the combining coefficients from the gNB via the higher layer (RRC or MAC-CE) or physical layer (L1) parameter (DCI).

In accordance with embodiments, the UE may be configured to select the quantization scheme (e.g., scheme 2 or 3) based on the number of number of reported beam indices and indices of delays/delay vectors (example see above) and to indicate in the CSI report the selected quantization scheme by higher layer (RRC) or physical layer (UCI).

In accordance with embodiments, the UE may be configured to select the quantization scheme (e.g., scheme 2 or 3) based on the number of number of beams and delays (example see above) to be reported and not to indicate in the CSI report the selected quantization scheme. Based on the number of reported beam indices and indices for the delays/delay vectors, the UE implicitly indicates to the gNB the quantization scheme selected by the UE.

Let $A_{l,p,i}$, $B_{l,p,i,j}$, $C_{l,p,j}$ and $D_{l,p,i,j}$ be the number of bits to quantize $a_{l,p,i}$, $b_{l,p,i,j}$, $c_{l,p,j}$ and $d_{l,p,i,j}$, respectively.

In accordance with embodiments, the combining coefficients for the L transmission layers are quantized according to at least one of the following alternatives.

In one example, the quantization of the amplitudes $a_{l,p,i}$ ($c_{l,p,j}$) and/or $b_{l,p,i,j}$ of scheme 1-4 is identical for all combining coefficients of a layer, i.e., a single value $A_l = A_{l,p,i}$ ($C_l = C_{l,p,i}$) and/or a single value $B_l = B_{l,p,i,j}$ is used for the l-th layer. The values of $A_l$ ($C_l$) and/or $B_l$ are either known and fixed at the UE, or configured via RRC signaling, or the UE reports them as a part of the CSI report, where $A_l$ ($C_l$) and/or $B_l$ may be different, identical for a subset of layers, or identical for all layers.

In another example, the quantization of the amplitudes $a_{l,p,i}$ ($c_{l,p,j}$) is not identical for the combining coefficients of a layer. In one instance, U values $A_{l,1,0}, \ldots, A_{l,1,U-1}$ are used for indices i=0, . . . , U−1 and both polarizations of the amplitudes $a_{l,p,i}$ of the l-th layer. In another instance, max $(D_u^{(l)})$ values $C_{l,1,0}, \ldots, C_{l,1,max(D_u^{(l)})-1}$ are used for indices j=0, . . . , max$(D_u^{(l)})$−1 and both polarizations of the amplitudes $c_{l,p,j}$ of the l-th layer. The values $A_{l,p,i}$ ($C_{l,p,j}$) are either known and fixed, configured via RRC signaling, or reported by the UE to the gNB.

In another example, the quantization of the amplitudes $b_{l,p,i,j}$ is not identical for the combining coefficients per layer.

In one instance, $B_{l,j}=B_{l,p,i,j}$ is identical for all amplitudes across all beams, polarizations and only depends on the layer and delay index. In another instance, $B_{l,i}=B_{l,p,i,j}$ is identical for all amplitudes across all delay vectors and polarizations and only depends on the layer and beam index. In another instance, $B_{l,p,i}=B_{l,p,i,j}$ is identical for both polarizations and depends on the beam, delay and layer index. The parameters $B_{l,j}$, $B_{l,i}$, or $B_{l,i,j}$ are either known at the UE, configured via RRC signaling, or the UE may report them as a part of the CSI report.

(a) Partitioning of Amplitudes into Two Subsets

In another example, the amplitudes $a_{l,p,i}$ ($c_{l,p,j}$) and/or $b_{l,p,i,j}$ are partitioned each into at least two disjoint subsets, and each subset is assigned a single and different value for the amplitude quantization.

In one instance, the number of sets is two, where each set contains the amplitudes with respect to a single polarization. In another instance, the number of sets for $a_{l,p,i}$ ($c_{l,p,j}$) is two, where the first set contains X amplitudes that correspond to the strongest/highest amplitudes, and the second set contains the remaining amplitudes. According to an exemplary embodiment, the amplitudes of the first set may be quantized with N∈{2,3,4} bits and the amplitudes of the second set with M∈{1,2,3} bits. In another instance, the number of sets for $a_{l,p,i}$ ($c_{l,p,j}$) is two, where the first set contains the strongest amplitude, and the second set contains the remaining amplitudes. The amplitude of the first set may be quantized with M=0 bits and hence not reported, and the amplitudes of the second set are quantized with N∈{1,2,3,4} bits. In another instance, the number of sets for $b_{l,p,i,j}$ is two, where the first set contains all amplitudes $b_{l,p,i,j}$ that correspond to the indices of the X strongest/highest amplitudes $a_{l,p,i}$, and the second set contains the remaining amplitudes. In another instance, the number of sets for $b_{l,p,i,j}$ is two, where the first set contains all amplitudes $b_{l,p,i,j}$ that correspond to the indices of the X strongest/highest amplitudes $c_{l,p,j}$, and the second set contains the remaining amplitudes. The parameter X may be a higher layer parameter and known at the UE, configured by the gNB, or reported by the UE. In another instance, applicable only for the fourth scheme, the number of sets for $b_{l,p,i,j}$ is two, where the first set contains all amplitudes $b_{l,p,i,j}$ with indices (p,i,j) that correspond to the indices of the X strongest/highest amplitudes $a_{l,p,i} \cdot c_{l,p,j}$, and the second set contains the remaining amplitudes. In another instance, applicable only for the fourth scheme, the number of sets for $b_{l,p,i,j}$ is two, where the first set contains all amplitudes $b_{l,p,i,j}$ with indices (p,i,j) that correspond to the indices of the $X_1$ strongest/highest amplitudes $a_{l,p,i}$ and of the $X_2$ strongest/highest amplitudes $c_{l,p,j}$, and the second set contains the remaining amplitudes. For these instances, the amplitudes of the first set may be quantized with N∈{1,2,3,4} bits and the amplitudes of the second set with M∈{0,1,2,3} bits. The amplitudes of the second set are not reported when M=0. The parameter(s) $X_1$ and $X_2$ may be higher layer parameters and known at the UE, configured by the gNB, or reported by the UE.

(b) Partitioning of Phases into Subsets

In one example, the quantization of the phases $d_{l,p,i,j}$ is identical for all combining coefficients of a layer, i.e., a single value $D_l=D_{l,p,i,j}$ is used for the l-th layer. The single value is either known and fixed at the UE, or configured via RRC signaling, or the UE reports them as a part of the CSI report, where the single value may be different, identical for a subset of layers, or identical for all layers.

In another example, the quantization of the phases $d_{l,p,i,j}$ is not identical for the combining coefficients of a layer. In one instance, $D_{l,j}=D_{l,p,i,j}$ is identical for all phases across all beams, polarizations and only depends on the layer and delay index. In another instance, $D_{l,i}=D_{l,p,i,j}$ is identical for all phases across all delay vectors and polarizations and only depends on the layer and beam index. In another instance, $D_{l,i,j}=D_{l,p,i,j}$ is identical for both polarizations and depends only on the beam, delay and layer index.

In another example, the phases $d_{l,p,i,j}$ are partitioned into at least two disjoint subsets (per layer), and each subset is assigned a single and different value for the phase quantization. In one instance, the number of sets is two, where each set contains the phases with respect to a single polarization. In another instance, the first set contains the phases corresponding to the X strongest/highest amplitudes $a_{l,p,i}$ ($c_{l,p,j}$), and the second set contains the phases corresponding to the remaining (weaker) amplitudes. In another instance, the first set contains the phases corresponding to the X strongest/highest amplitudes $a_{l,p,i}b_{l,p,i,j}$ (or $c_{l,p,j}b_{l,p,i,j}$) and the second set contains the remaining phases. In another instance, applicable only for the fourth scheme, the first set contains the phases corresponding to the X strongest/highest amplitudes $a_{l,p,i}c_{l,p,j}$ and the second set the remaining phases. In another instance, applicable only for the fourth scheme, the first set contains the phases corresponding to the X strongest/highest amplitudes $a_{l,p,i}b_{l,p,i,j}c_{l,p,j}$, and the second set contains the remaining phases. In another instance, applicable only for the second and fourth scheme, the first set contains the phases corresponding to the $X_1$ strongest/highest amplitudes $a_{l,p,i}$ and to the $X_2$ first (strongest) delays with indices j=0, . . . , $X_2-1$, and the second set contains the remaining phases. The phases $d_{l,p,i,j}$ of the first set may be quantized with N bits and the phases of the second set with M bits. The phases of the second set are not reported when M=0. Examples of (N,M) are (4,3), (4,2), (4,1), (4,0), (3,2), (3,1), (3,0), (2,1), (2,0). The parameters X, $X_1$, and $X_2$ may be either known at the UE, selected and reported by the UE, or configured by the gNB. Note that the phases $d_{l,p,i,j}$ corresponding to the amplitudes $\tilde{a}_{l,p,i}=0$ ($\tilde{c}_{l,p,j}=0$), or $\tilde{a}_{l,p,i}\tilde{b}_{l,p,i,j}=0$ (or $\tilde{c}_{l,p,j}\tilde{b}_{l,p,i,j}=0$), where $\tilde{a}_{l,p,i}$, $\tilde{b}_{l,p,i,j}$, $\tilde{c}_{l,p,j}$ represent the quantized amplitudes of $a_{l,p,i}$, $b_{l,p,i,j}$, $c_{l,p,j}$, respectively, are not reported.

In another example, the phases $d_{l,p,i,j}$ are partitioned into at least three disjoint subsets (per layer), and each subset is assigned a single and different value for the phase quantization. In one instance, the first set contains the phases corresponding to the $X_1$ first strongest/highest amplitudes $a_{l,p,i}$ (or $c_{l,p,j}$), the second set contains the phases corresponding to the $X_2$ second strongest/highest amplitudes $a_{l,p,i}$ (or $c_{l,p,j}$), and the third set contains the remaining amplitudes. In another instance, the first set contains the phases corresponding to the $X_1$ strongest/highest amplitudes $a_{l,p,i}b_{l,p,i,j}$ (or $c_{l,p,j}b_{l,p,i,j}$), the second set contains the phases corresponding to the $X_2$ second strongest/highest amplitudes $a_{l,p,i}b_{l,p,i,j}$ (or $c_{l,p,j}b_{l,p,i,j}$), and the third set contains the remaining amplitudes. The phases $d_{l,p,i,j}$ of the first set may be quantized with N bits, the phases of the second set with M bits and phases of the third set with V bits. If V=0, the phases of the third set are not reported. The parameters $X_1$ and $X_2$ may be either known at the UE, selected and reported by the UE, or configured by the gNB. Examples of (N,M,V) are (4,3,2), (4,3,1), (4,3,0), (4,2,1), (4,2,0), (4,1,0), (3,2,1), (3,2,0), (3,1,0). Note again that the phases $d_{l,p,i,j}$ corresponding to the amplitudes $\tilde{a}_{l,p,i}=0$ ($\tilde{c}_{l,p,j}=0$), or $\tilde{a}_{l,p,i}\tilde{b}_{l,p,i,j}=0$ (or $\tilde{c}_{l,p,j}\tilde{b}_{l,p,i,j}=0$), where $\tilde{a}_{l,p,i}$, $\tilde{b}_{l,p,i,j}$, $\tilde{c}_{l,p,j}$ represent the quantized amplitudes of $a_{l,p,i}$, $b_{l,p,i,j}$, $c_{l,p,j}$, respectively, are not reported.

In accordance with embodiments, the UE is configured to quantize the amplitudes $c_{l,p,j}$ (and/or $a_{l,p,i}$) with N=3 bits with one of the quantization schemes described above, where the 8 quantization levels are given by $\{0, \sqrt{1/64}, \sqrt{1/32}, \sqrt{1/16}, \sqrt{1/8}, \sqrt{1/4}, \sqrt{1/2}, 1\}$.

In accordance with embodiments, the UE is configured to quantize the amplitudes $c_{l,p,j}$ (and/or $a_{l,p,i}$) with N=2 bits with one of the quantization schemes described above, where the four quantization levels are given by $\{0, 0.25, 0.5, 1\}$.

In accordance with embodiments, the UE is configured to quantize the amplitudes $b_{l,p,i,j}$ with N=2 bits with one of the quantization schemes described above, where the four quantization levels are given by $\{0, 0.25, 0.5, 1\}$.

In accordance with embodiments, the UE may be configured to quantize the amplitudes $b_{l,p,i,j}$ with N=1 bits for the l-th layer, where the two amplitude quantization levels (x,y) are given by "x=0" and "y=1".

In accordance with embodiments, the UE is configured not to report the amplitudes $b_{l,p,i,j}$ with indices (l, p, i) for which the quantized amplitudes $\tilde{a}_{l,p,i}=0$.

In accordance with embodiments, the UE is configured not to report the amplitudes $b_{l,p,i,j}$ with indices (l,p,j) for which the quantized amplitudes $\tilde{c}_{l,p,j}=0$.

(c) Selection, Indication and Reporting of K Combining Coefficients

In accordance with some exemplary embodiments, the UE is configured to partition the amplitudes $b_{l,p,i,j}$ into at least two disjoint subsets possibly per layer, and each subset is assigned a single value for the quantization of the amplitudes. The amplitudes are partitioned into two sets where the first set contains the amplitudes corresponding to K selected combining coefficients and the second set contains the remaining amplitudes corresponding to the remaining coefficients. For example, the amplitudes of the first set may correspond to the K strongest combining coefficients (i.e., the combining coefficients having the highest amplitude/power over all combining coefficients) and the second set may contain the amplitudes corresponding to the set the remaining coefficients. The amplitudes $b_{l,p,i,j}$ of the first set may be quantized with N (N∈{1,2,3,4}) bits and reported, and the amplitudes of the second set with M=0 bits, i.e., they are not reported. In order to indicate the selected combining coefficients/amplitudes of the first set, the UE may report a bitmap, where each bit is associated with an amplitude $b_{l,p,i,j}$. A "1" in the bitmap may indicate that the corresponding amplitude of the combining coefficient is reported and a "0" may indicate that the corresponding amplitude is not reported. The bitmap may therefore contain K or less than K "1". The bitmap used for indicating the selected delay vectors per beam (see above) is identical with the bitmap used for reporting the amplitudes $b_{l,p,i,j}$, and hence it may not be reported. The higher layer parameter K may be known at the UE, configured by the gNB, or reported by the UE. The parameter K may be identical for a subset of the layers.

In accordance with embodiments, the UE may be configured to quantize the amplitudes $b_{l,p,i,j}$ with N=1 bits for the l-th layer. In one instance, the two amplitude quantization levels (x,y) are given by "x=0.5" and "y=1". In another instance, the two amplitude quantization levels (x,y) are given by "x=0" and "y=1". When the two amplitude quantization levels (x,y) are given by "x=0" and "y=1", the quantized amplitudes $\tilde{b}_{l,p,i,j}$ represent a bitmap which is identical to the bitmap for indicating the selected delays of the delay indicator (see above). In this case, the bitmap for indicating the selected delays of the delay indicator may not be reported.

In accordance with embodiments, the UE is configured to partition the phases $d_{l,p,i,j}$ into at least two disjoint subsets (per layer), and each subset is assigned a single value for phase quantization. The number of sets for $d_{l,p,i,j}$ is two, where the first set contains the phases corresponding to the K selected combining coefficients (indicated by the bitmap) and the second set contains the remaining phases. The phases of the first set may be quantized with N (N∈{2,3,4}) bits and the phases of the second set with M (M∈{0,1,2}) bits. When M=0, the phases of the second set are not reported. The reported phases from the first set are indicated by the same bitmap used for the indication of the amplitudes $b_{l,p,i,j}$.

In accordance with embodiments, the UE is configured to partition the phases $d_{l,p,i,j}$ into at least three disjoint subsets (per layer), and each subset is assigned a single value for phase quantization. The first set contains the phases corresponding to the $K_1$ strongest combining coefficients, the second set contains the phases corresponding to the $K_2$ strongest combining coefficients, and the third set contains the remaining phases. The phases of the first set may be quantized with N (N∈{2,3,4}) bits, the phases of the second set with M (M∈{1,2,3}) bits and the phases of the third set with V (V∈{0,1}) bits. When V=0, the phases of the third set are not reported. The phases of the first and second set are indicated by the same bitmap used for the indication of the K amplitudes $b_{l,p,i,j}$, where $K=K_1+K_2$. The higher layer parameters $K_1$ and $K_2$ may be known at the UE, configured by the gNB, or reported by the UE.

Examples of the amount of feedback bits required for amplitude reporting for the above four schemes are shown in FIG. 6 to FIG. 12.

Normalization of Combining Coefficients

In accordance with embodiments, the UE is configured to normalize the combining coefficients with respect to the strongest combining coefficient (corresponding to coefficient associated with the largest amplitude) in amplitude and phase such that the strongest combining coefficient is given by the value one.

The amplitude(s) $a_{l,p,i}$ (and/or $c_{l,p,j}$) to be reported are sorted with respect to the strongest/largest amplitude. For example, the amplitudes $a_{l,p,i}$ are sorted such that the strongest amplitude $a_{l,1,0}$ is associated with the leading beam and the first beam index and the first polarization. Similarly, the amplitudes $c_{l,p,j}$ are sorted such that the strongest amplitude $c_{l,1,0}$ is associated with the first polarization and first delay.

The amplitude(s) $a_{l,p,i}$ (and/or $c_{l,p,j}$) to be reported are sorted and normalized such that the strongest amplitude is $a_{l,1,0}$ (and/or $c_{l,1,0}$) and not reported.

Indication and Reporting of K Combining Coefficients

In accordance with some exemplary embodiments, the gNB is configured to configure, for the UE, the value of K, indicating the maximum number of non-zero coefficients to be reported for the first layer of the precoder matrix by higher layer (RRC). The value of K for the second layer may be calculated by the UE based on the value of K of the first layer. For example, the value K of second layer "K(2)" is given by K(2)=⌈βK(1)⌉, where "K(1)" denotes the value of K for the first layer and β is a value ranging from 0 to 1. In one instance, the supported values of β are given by $$\left\{0, \frac{1}{2}, \frac{2}{3}, \frac{3}{4}, 1\right\}.$$

The specific value of $\beta$ is a priori known to the UE, or configured by higher layer (RRC) by the gNB.

Amplitude Sets for the Quantization Schemes According to Some Exemplary Embodiments Herein:

In accordance with some exemplary embodiments, the amplitudes or a subset of the amplitudes $b_{l,p,i,j}$ (or $a_{l,p,i}$ or $c_{l,p,j}$) corresponding to the selected non-zero coefficients by the UE are quantized with N bits, where the amplitude set is given by $$\left\{0, \left(\frac{1}{2^F}\right)^{\frac{1}{x}}, \left(\frac{1}{2^{F-1}}\right)^{\frac{1}{x}}, \dots, \left(\frac{1}{2^1}\right)^{\frac{1}{x}}, \dots, 1\right\}.$$

Here, $F=2^N-1$ and $x \in \{1,2,3,\dots\}$ is a parameter that controls the amplitude level size. Note that the amplitude set comprises F+2 amplitude levels. However, since only non-zero coefficients are reported by the UE, each reported amplitude value is from the set $$\left\{\left(\frac{1}{2^F}\right)^{\frac{1}{x}}, \left(\frac{1}{2^{F-1}}\right)^{\frac{1}{x}}, \dots, \left(\frac{1}{2^1}\right)^{\frac{1}{x}}, \dots, 1\right\}$$

and may therefore be represented by log 2(F+1)=N bits. Examples of values for x are 1 and 2. In one instance, x=1 and N=3. Then, the amplitude set is given by $$\left\{0, \frac{1}{128}, \frac{1}{64}, \frac{1}{32}, \frac{1}{16}, \frac{1}{8}, \frac{1}{4}, \frac{1}{2}, 1\right\}.$$

In another instance, x=2 and N=3 and the amplitude set is given by $$\left\{0, \frac{1}{\sqrt{128}}, \frac{1}{\sqrt{64}}, \frac{1}{\sqrt{32}}, \frac{1}{\sqrt{16}}, \frac{1}{\sqrt{8}}, \frac{1}{\sqrt{4}}, \frac{1}{\sqrt{2}}, 1\right\}.$$

In another instance, x=1 and N=2 and the amplitude set is given by $$\left\{0, \frac{1}{8}, \frac{1}{4}, \frac{1}{2}, 1\right\}.$$

In another instance, x=2 and N=2 and the amplitude set is given by $$\left\{0, \frac{1}{\sqrt{8}}, \frac{1}{\sqrt{4}}, \frac{1}{\sqrt{2}}, 1\right\}.$$

Strongest Coefficient Indicator

In accordance with some exemplary embodiments, the UE may be configured to normalize the combining coefficients of the precoder with respect to the strongest combining coefficient (the coefficient associated with the largest amplitude) in amplitude and phase such that the strongest combining coefficient may be given by the value 1. Moreover, the UE may be configured to indicate the strongest combining coefficient in the bitmap by setting the associated bit to one, but not to quantize and report the strongest combining coefficient. In order to indicate the beam vector and delay vector index associated with the strongest coefficient, the UE may be configured to report a strongest coefficient indicator, which indicates the position of the strongest combining coefficient in the bitmap. The strongest coefficient indicator may be represented by a value $K_s$, which is in the range of $1 \leq K_s \leq K_1$, where $K_1$ is the number of reported non-zero combining coefficients. For example, when $K_s=n$, the indices associated with the n-th bit in the bitmap corresponds to the indices of the strongest combining coefficient.

According to yet another exemplary embodiment herein, for the quantization and reporting of the combining coefficients of the precoder matrix, one additional bit allocation scheme to report the amplitude and phase of the selected combining coefficients is presented in the following.

The present scheme, referred here as the fifth scheme or scheme (5), may be considered as a simplification of the amplitude/phase quantization scheme 2 or the second scheme described above. Scheme (5) further reduces the feedback overhead for reporting the common amplitudes $a_{l,p,i}$ by representing the amplitudes $a_{l,p,i}$ as beam-independent and polarization-dependent parameters, such that $a_{l,p,i}=a_{l,p} \forall i$. In this way, the number of reported common amplitude values $a_{l,p,i}$ per layer reduces from $2U^{(l)}$ to only 2.

In accordance with an exemplary embodiment, in the fifth scheme each combining coefficient $\gamma_{p,i,j}^{(l)}$, is written as a product of three coefficients $a_{l,p}$, $b_{l,p,i,j}$ and $d_{l,p,i,j}$, $$\gamma_{p,i,j}^{(l)}=a_{l,p}b_{l,p,i,j}d_{l,p,i,j},$$

where $a_{l,p}$ is a polarization-specific real-valued coefficient representing a common amplitude across all combining coefficients associated with the p-th polarization and l-th layer, $b_{l,p,i,j}$ is a real-valued normalized combining-coefficient representing the amplitude associated with the i-th spatial beam vector, j-the delay vector, p-th polarization and l-th layer, and $$d_{l,p,i,j} = \exp\left(\frac{\sqrt{-1}\,2\pi n}{2^N}\right); n \in \{0, 1, \dots, 2^N - 1\}, N \in \{0, 1, 2, 3, 4\}$$

is a coefficient to indicate the phase of $\gamma_{p,i,j}^{(l)}$.

In accordance with an exemplary embodiment, the UE is configured to report the quantized amplitude values $a_{l,p}$, $b_{l,p,i,j}$ and the phase values $d_{l,p,i,j}$ corresponding to the per-layer selected non-zero combining coefficients $\gamma_{p,i,j}^{(l)}$, selected by the UE. Moreover, the UE may be configured to normalize the combining coefficients $\gamma_{p,i,j}^{(l)}$ such that the largest amplitude of the coefficients $\gamma_{p,i,j}^{(l)}$ is given by 1. Consequently, for the polarization $\bar{p}$ associated with the strongest (normalized) coefficient $\gamma_{p,i,j}^{(l)}=1$, $a_{l,\bar{p}}=1$ and the common amplitude $a_{l,\bar{p}}$ is not reported.

Amplitude Sets for Quantization of $a_{l,p}$ and $b_{l,p,i,l}$

In accordance with an exemplary embodiment, the UE may be configured to quantize the amplitudes $b_{l,p,i,j}$ for the l-th layer with N=2, 3 or 4 bits, and the amplitude set is given by $$B = \left\{1, \left(\frac{1}{2^{F-1}}\right)^{\frac{1}{x}}, \left(\frac{1}{2^{2(F-1)}}\right)^{\frac{1}{x}}, \dots, \left(\frac{1}{2^{(2^N-2)(F-1)}}\right)^{\frac{1}{x}}, \dots, 0\right\}.$$

As an example, when x=4, F=2 and N=3, the amplitude set of B is given by $$B = \left\{ 1, \left(\frac{1}{2}\right)^{\frac{1}{4}}, \left(\frac{1}{2^2}\right)^{\frac{1}{4}}, \left(\frac{1}{2^3}\right)^{\frac{1}{4}}, \left(\frac{1}{2^4}\right)^{\frac{1}{4}}, \left(\frac{1}{2^5}\right)^{\frac{1}{4}}, \left(\frac{1}{2^6}\right)^{\frac{1}{4}}, 0 \right\}.$$

In another example, x=4, F=3, N=3, and the amplitude set of B is given by $$B = \left\{ 1, \left(\frac{1}{2^2}\right)^{\frac{1}{4}}, \left(\frac{1}{2^4}\right)^{\frac{1}{4}}, \left(\frac{1}{2^6}\right)^{\frac{1}{4}}, \left(\frac{1}{2^8}\right)^{\frac{1}{4}}, \left(\frac{1}{2^{10}}\right)^{\frac{1}{4}}, \left(\frac{1}{2^{12}}\right)^{\frac{1}{4}}, 0 \right\}.$$

In another example, x=4, F=3, N=2, and the amplitude set of B is given by $$B = \left\{ 1, \left(\frac{1}{2^2}\right)^{\frac{1}{4}}, \left(\frac{1}{2^4}\right)^{\frac{1}{4}}, 0 \right\}.$$

In another example, x=2, F=3, N=2, and the amplitude set of B is given by $$B = \left\{ 1, \left(\frac{1}{2}\right)^{\frac{1}{2}}, \left(\frac{1}{2^4}\right)^{\frac{1}{2}}, 0 \right\}.$$

In accordance with an exemplary embodiment, the polarization-specific amplitude $a_{l,p}$ is quantized with =2, 3 or 4 bits, and the amplitude set is given by $$A = \left\{ 1, \left(\frac{1}{2^F}\right)^{\frac{1}{x}}, \left(\frac{1}{2^{2F}}\right)^{\frac{1}{x}}, \ldots, \left(\frac{1}{2^{(2^N-2)F}}\right)^{\frac{1}{x}}, 0 \right\}.$$

As an example, when x=4, F=1 and N=4, the amplitude set is given by $$A = \left\{ \begin{array}{l} 1, \left(\frac{1}{2}\right)^{\frac{1}{4}}, \left(\frac{1}{2^2}\right)^{\frac{1}{4}}, \left(\frac{1}{2^3}\right)^{\frac{1}{4}}, \left(\frac{1}{2^5}\right)^{\frac{1}{4}}, \left(\frac{1}{2^6}\right)^{\frac{1}{4}}, \left(\frac{1}{2^7}\right)^{\frac{1}{4}}, \left(\frac{1}{2^8}\right)^{\frac{1}{4}}, \\ \left(\frac{1}{2^9}\right)^{\frac{1}{4}}, \left(\frac{1}{2^{10}}\right)^{\frac{1}{4}}, \left(\frac{1}{2^{11}}\right)^{\frac{1}{4}}, \left(\frac{1}{2^{12}}\right)^{\frac{1}{4}}, \left(\frac{1}{2^{13}}\right)^{\frac{1}{4}}, \left(\frac{1}{2^{14}}\right)^{\frac{1}{4}}, 0 \end{array} \right\}.$$

As seen in FIG. 20, when N=4, the amplitude set A consists of 16 values, where 12 values lie in the range from '0' to '0.5'. The use of this amplitude set is therefore only effective when the polarization-specific amplitude values $a_{l,p}$, reported by the UE, are unequally distributed and mainly given by small values compared to the polarization-specific amplitude of the strongest polarization which is always '1' (i.e., $a_{l,\bar{p}}=1$).

However, the assumption of the unequal distribution of the polarization-specific amplitude values $a_{l,p}$ may not always be satisfied and mainly depends on the channel environment. For some channel environments, the polarization-specific amplitude values $a_{l,p}$ of the weak polarization is equally distributed, such that an amplitude set having a linear increase of the quantization levels may be superior compared to the above amplitude set A and improves system performance, see FIG. 21 and FIG. 22. Therefore, in the following embodiments, some examples of "linear" amplitude sets are presented for the quantization of the polarization-specific amplitude value $a_{l,p}$.

In accordance with an exemplary embodiment, the polarization-specific amplitude $a_{l,p}$ is quantized with N=2, 3 or 4 bits, and the amplitude set is given by $$A = \left\{ 1, \frac{2^N-2}{2^N-1}, \ldots, \frac{2}{2^N-1}, \frac{1}{2^N-1}, 0 \right\}.$$

In one example, when N=2, the amplitude set is given by $$A = \left\{ 1, \frac{2}{3}, \frac{1}{3}, 0 \right\}.$$

In another example, N=3 and the amplitude set is given by $$A = \left\{ 1, \frac{6}{7}, \frac{5}{7}, \frac{4}{7}, \frac{3}{7}, \frac{2}{7}, \frac{1}{7}, 0 \right\}.$$

In another example, N=4 and the amplitude set is given by $$A = \left\{ 1, \frac{14}{15}, \frac{13}{15}, \frac{12}{15}, \frac{11}{15}, \frac{10}{15}, \frac{9}{15}, \frac{8}{15}, \frac{7}{15}, \frac{6}{15}, \frac{5}{15}, \frac{4}{15}, \frac{3}{15}, \frac{2}{15}, \frac{1}{15}, 0 \right\}.$$

For some of the quantization in the above amplitude sets A and B, the product of a quantization level in A and a quantization level in B represents again a quantization level in B, i.e., $y_j=x_i y_k$, where $x_i \in A$ and $y_j, y_k \in B$. In order to avoid such a redundancy, the following exemplary embodiments present examples of amplitude sets of A where common quantization levels in set A and B, except for the values '0' and '1', are kept to a minimum.

In accordance with an exemplary embodiment, the amplitude sets for quantizing the amplitudes $a_{l,p}$ and $b_{l,p,i,j}$ may be different such that the quantization levels in the amplitude set A are not contained in the amplitude set B, except for the values "1" and "0".

In accordance with an exemplary embodiment, the polarization-reference amplitude $a_{l,p}$ is quantized with N=2 or 3 or 4 bits, and the amplitude set is given by $$A = \left\{ 1, \left(\frac{1}{2^{F-1}}\right)^{\frac{1}{x}}, \left(\frac{1}{2^{2F-1}}\right)^{\frac{1}{x}}, \ldots, \left(\frac{1}{2^{(2^N-2)F-1}}\right)^{\frac{1}{x}}, \ldots, 0 \right\}.$$

As an example, when x=4, F=2 and N=3, the amplitude set is given by $$A = \left\{ 1, \left(\frac{1}{2}\right)^{\frac{1}{4}}, \left(\frac{1}{2^3}\right)^{\frac{1}{4}}, \left(\frac{1}{2^5}\right)^{\frac{1}{4}}, \left(\frac{1}{2^7}\right)^{\frac{1}{4}}, \left(\frac{1}{2^9}\right)^{\frac{1}{4}}, \left(\frac{1}{2^{11}}\right)^{\frac{1}{4}}, 0 \right\}.$$

In another example, x=4, F=3, N=3, and the amplitude set is given by $$A = \left\{1, \left(\frac{1}{2^2}\right)^{\frac{1}{4}}, \left(\frac{1}{2^5}\right)^{\frac{1}{4}}, \left(\frac{1}{2^8}\right)^{\frac{1}{4}}, \left(\frac{1}{2^{11}}\right)^{\frac{1}{4}}, \left(\frac{1}{2^{14}}\right)^{\frac{1}{4}}, \left(\frac{1}{2^{17}}\right)^{\frac{1}{4}}, 0\right\}.$$

In another example, x=4, F=2, N=2, and the amplitude set is give by $$A = \left\{1, \left(\frac{1}{2^1}\right)^{\frac{1}{4}}, \left(\frac{1}{2^3}\right)^{\frac{1}{4}}, 0\right\}.$$

In another example, x=4, F=3, N=2, and the amplitude set is given by $$A = \left\{1, \left(\frac{1}{2^2}\right)^{\frac{1}{4}}, \left(\frac{1}{2^5}\right)^{\frac{1}{4}}, 0\right\}.$$

In another example, x=2, F=2 and N=2, and the amplitude set is given by $$A = \left\{1, \left(\frac{1}{2^1}\right)^{\frac{1}{2}}, \left(\frac{1}{2^3}\right)^{\frac{1}{2}}, 0\right\}.$$

Since non-zero coefficients are reported, the quantization level "0" may not be included in the amplitude sets A and/or B used for the quantization of the amplitudes $a_{l,p}$ and/or $b_{l,p,i,j}$. The following exemplary embodiment present examples of amplitude sets of A and B, where the quantization level '0' is replaced by another quantization level.

In accordance with an exemplary embodiment, the polarization-specific amplitude $a_{l,p}$ is quantized with N=2, 3 or 4 bits, and the amplitude set is given by $$A = \left\{1, \left(\frac{1}{2^F}\right)^{\frac{1}{x}}, \left(\frac{1}{2^{2F}}\right)^{\frac{1}{x}}, \ldots, \left(\frac{1}{2^{(2^N-2)F}}\right)^{\frac{1}{x}}, \left(\frac{1}{2^{(2^N-1)F}}\right)^{\frac{1}{x}}\right\}.$$

As an example, when x=4, F=1 and N=4, the amplitude set is given by $$A = \left\{1, \left(\frac{1}{2}\right)^{\frac{1}{4}}, \left(\frac{1}{2^2}\right)^{\frac{1}{4}}, \left(\frac{1}{2^3}\right)^{\frac{1}{4}}, \left(\frac{1}{2^4}\right)^{\frac{1}{4}}, \left(\frac{1}{2^5}\right)^{\frac{1}{4}}, \left(\frac{1}{2^6}\right)^{\frac{1}{4}}, \left(\frac{1}{2^7}\right)^{\frac{1}{4}}, \left(\frac{1}{2^8}\right)^{\frac{1}{4}},\right.$$

$$\left.\left(\frac{1}{2^9}\right)^{\frac{1}{4}}, \left(\frac{1}{2^{10}}\right)^{\frac{1}{4}}, \left(\frac{1}{2^{11}}\right)^{\frac{1}{4}}, \left(\frac{1}{2^{12}}\right)^{\frac{1}{4}}, \left(\frac{1}{2^{13}}\right)^{\frac{1}{4}}, \left(\frac{1}{2^{14}}\right)^{\frac{1}{4}}, \left(\frac{1}{2^{15}}\right)^{\frac{1}{4}}\right\}.$$

In accordance with an exemplary embodiment, the polarization-specific amplitude $a_{l,p}$ is quantized with N=2 or 3 or 4 bits, where the amplitude set is given by $$A = \left\{1, \frac{2^N-1}{2^N}, \ldots, \frac{2}{2^N}, \frac{1}{2^N}\right\}.$$

In one example, N=2, the amplitude set is given by $$A = \left\{1, \frac{3}{4}, \frac{2}{4}, \frac{1}{4}\right\}.$$

In another example, N=3 and the amplitude set is given by $$A = \left\{1, \frac{7}{8}, \frac{6}{8}, \frac{5}{8}, \frac{4}{8}, \frac{3}{8}, \frac{2}{8}, \frac{1}{8}\right\}.$$

In another example, N=4 and the amplitude set is given by $$A = \left\{1, \frac{15}{16}, \frac{14}{16}, \frac{13}{16}, \frac{12}{16}, \frac{11}{16}, \frac{10}{16}, \frac{9}{16}, \frac{8}{16}, \frac{7}{16}, \frac{6}{16}, \frac{5}{16}, \frac{4}{16}, \frac{3}{16}, \frac{2}{16}, \frac{1}{16}\right\}.$$

In accordance with an exemplary embodiment, the amplitude sets for quantizing $a_{l,p}$ is given by $$A = \left\{1, \left(\frac{1}{2^{F-1}}\right)^{\frac{1}{x}}, \left(\frac{1}{2^{2F-1}}\right)^{\frac{1}{x}}, \ldots, \left(\frac{1}{2^{(2^N-1)F-1}}\right)^{\frac{1}{x}}\right\}.$$

In one example, x=4, F=2, N=3, and the amplitude set for quantizing $a_{l,p}$ is given by $$A = \left\{1, \left(\frac{1}{2}\right)^{\frac{1}{4}}, \left(\frac{1}{2^3}\right)^{\frac{1}{4}}, \left(\frac{1}{2^5}\right)^{\frac{1}{4}}, \left(\frac{1}{2^7}\right)^{\frac{1}{4}}, \left(\frac{1}{2^9}\right)^{\frac{1}{4}}, \left(\frac{1}{2^{11}}\right)^{\frac{1}{4}}, \left(\frac{1}{2^{13}}\right)^{\frac{1}{4}}\right\}.$$

In accordance with an exemplary embodiment, the amplitude set for quantizing $b_{l,p,i,j}$ is given by $$B = \left\{1, \left(\frac{1}{2^{F-1}}\right)^{\frac{1}{x}}, \left(\frac{1}{2^{2(F-1)}}\right)^{\frac{1}{x}}, \ldots, \left(\frac{1}{2^{(2^N-1)(F-1)}}\right)^{\frac{1}{x}}\right\}.$$

As an example, x=4, F=3, N=3, and the amplitude set is given by $$B = \left\{1, \left(\frac{1}{2^2}\right)^{\frac{1}{4}}, \left(\frac{1}{2^4}\right)^{\frac{1}{4}}, \left(\frac{1}{2^6}\right)^{\frac{1}{4}}, \left(\frac{1}{2^8}\right)^{\frac{1}{4}}, \left(\frac{1}{2^{10}}\right)^{\frac{1}{4}}, \left(\frac{1}{2^{12}}\right)^{\frac{1}{4}}, \left(\frac{1}{2^{14}}\right)^{\frac{1}{4}}\right\}.$$

In accordance with an exemplary embodiment, in order to save feedback overhead the UE may be configured not to report the part of the bitmap corresponding to the combining coefficients for which $a_{l,p}$=0. In this way, the size of bitmap reduces from $2U^{(l)}D^{(l)}$ to $U^{(l)}D^{(l)}$ bits, where $U^{(l)}$ denotes the number of configured spatial beams per polarization for the l-th layer, and $D^{(l)}$ denotes the number of configured delays for the l-th layer.

In accordance with an exemplary embodiment, instead of replacing '0' in the amplitude set for quantizing $a_{l,p}$ with a further smaller value close to zero, the following amplitude set may be used, given by $$A = \left\{ 1, \left(\frac{1}{2^F}\right)^{\frac{1}{y}}, \left(\frac{1}{2^F}\right)^{\frac{1}{x}}, \left(\frac{1}{2^{2F}}\right)^{\frac{1}{x}}, \ldots, \left(\frac{1}{2^{(2^N-2)F}}\right)^{\frac{1}{x}} \right\}$$

where y is defined such that $$1 > \left(\frac{1}{2^F}\right)^{\frac{1}{y}} > \left(\frac{1}{2^F}\right)^{\frac{1}{x}}.$$

Possible values of y may be given by $y=x+q$, where $q \in \mathbb{R}^+$.

As an example, when N=4, F=1, x=4 and q=1, the amplitude set is given by $$A = \left\{ 1, \left(\frac{1}{2}\right)^{\frac{1}{5}}, \left(\frac{1}{2}\right)^{\frac{1}{4}}, \left(\frac{1}{2^2}\right)^{\frac{1}{4}}, \left(\frac{1}{2^3}\right)^{\frac{1}{4}}, \left(\frac{1}{2^4}\right)^{\frac{1}{4}}, \left(\frac{1}{2^5}\right)^{\frac{1}{4}}, \left(\frac{1}{2^6}\right)^{\frac{1}{4}}, \left(\frac{1}{2^7}\right)^{\frac{1}{4}}, \right.$$
$$\left. \left(\frac{1}{2^8}\right)^{\frac{1}{4}}, \left(\frac{1}{2^9}\right)^{\frac{1}{4}}, \left(\frac{1}{2^{10}}\right)^{\frac{1}{4}}, \left(\frac{1}{2^{11}}\right)^{\frac{1}{4}}, \left(\frac{1}{2^{12}}\right)^{\frac{1}{4}}, \left(\frac{1}{2^{13}}\right)^{\frac{1}{4}}, \left(\frac{1}{2^{14}}\right)^{\frac{1}{4}} \right\}$$

In accordance with an exemplary embodiment, instead of replacing '0' in the amplitude set for quantizing $a_{l,p}$ with a further smaller value close to zero, the following amplitude set may be used, given by $$A = \left\{ 1, \left(\frac{1}{2^{jF}}\right)^{\frac{1}{y}}, \left(\frac{1}{2^F}\right)^{\frac{1}{x}}, \left(\frac{1}{2^{2F}}\right)^{\frac{1}{x}}, \ldots, \left(\frac{1}{2^{(2^N-2)F}}\right)^{\frac{1}{x}} \right\},$$

where $y \in \mathbb{R}^+$ and $j \in \mathbb{R}^+$. Depending on the value of y and j, the amplitude the $$\left(\frac{1}{2^{jF}}\right)^{\frac{1}{y}}$$

lies in between any two of the amplitude levels. As an example, when N=4, F=1, x=4, y=3, and j=5 the amplitude set is given by $$A = \left\{ 1, \left(\frac{1}{2^5}\right)^{\frac{1}{3}}, \left(\frac{1}{2}\right)^{\frac{1}{4}}, \left(\frac{1}{2^2}\right)^{\frac{1}{4}}, \left(\frac{1}{2^3}\right)^{\frac{1}{4}}, \left(\frac{1}{2^4}\right)^{\frac{1}{4}}, \left(\frac{1}{2^5}\right)^{\frac{1}{4}}, \left(\frac{1}{2^6}\right)^{\frac{1}{4}}, \left(\frac{1}{2^7}\right)^{\frac{1}{4}}, \right.$$
$$\left. \left(\frac{1}{2^8}\right)^{\frac{1}{4}}, \left(\frac{1}{2^9}\right)^{\frac{1}{4}}, \left(\frac{1}{2^{10}}\right)^{\frac{1}{4}}, \left(\frac{1}{2^{11}}\right)^{\frac{1}{4}}, \left(\frac{1}{2^{12}}\right)^{\frac{1}{4}}, \left(\frac{1}{2^{13}}\right)^{\frac{1}{4}}, \left(\frac{1}{2^{14}}\right)^{\frac{1}{4}} \right\}$$

In another example, when N=4, F=1, x=4, y=4, and j=9/2, the amplitude set is given by $$A = \left\{ 1, \left(\frac{1}{2^9}\right)^{\frac{1}{8}}, \left(\frac{1}{2}\right)^{\frac{1}{4}}, \left(\frac{1}{2^2}\right)^{\frac{1}{4}}, \left(\frac{1}{2^3}\right)^{\frac{1}{4}}, \left(\frac{1}{2^4}\right)^{\frac{1}{4}}, \left(\frac{1}{2^5}\right)^{\frac{1}{4}}, \left(\frac{1}{2^6}\right)^{\frac{1}{4}}, \left(\frac{1}{2^7}\right)^{\frac{1}{4}}, \right.$$
$$\left. \left(\frac{1}{2^8}\right)^{\frac{1}{4}}, \left(\frac{1}{2^9}\right)^{\frac{1}{4}}, \left(\frac{1}{2^{10}}\right)^{\frac{1}{4}}, \left(\frac{1}{2^{11}}\right)^{\frac{1}{4}}, \left(\frac{1}{2^{12}}\right)^{\frac{1}{4}}, \left(\frac{1}{2^{13}}\right)^{\frac{1}{4}}, \left(\frac{1}{2^{14}}\right)^{\frac{1}{4}} \right\}$$

The distribution of the polarization-specific amplitude of the weak polarization may not always be close to zero and may always lie above a certain threshold value which is greater than zero. Therefore, instead of using the amplitude levels close to zero, the amplitude levels can be restricted to start from a threshold value which may result in a superior performance.

In accordance with an exemplary embodiment, the amplitude set for quantizing $a_{l,p}$ may be given by $$A = \left\{ 1, x + \frac{(2^N - 3) \cdot (1 - x)}{2^N - 2}, \ldots, x + \left(\frac{1 \cdot (1 - x)}{2^N - 2}\right), x, 0 \right\},$$

where the amplitude set linearly increases from the value 'x' till '1', other than zero.

As an example, when N=4 and x=0.3, the amplitude set is given by $A=\{1, 0.95, 0.9, 0.85, 0.8, 0.75, 0.7, 0.65, 0.6, 0.55, 0.5,$
$0.45, 0.4, 0.35, 0.3, 0\}$ In accordance with an exemplary embodiment, the amplitude set for quantizing $a_{l,p}$ may be given by $$A = \left\{ 1, x + \frac{(2^N - 2) \cdot (1 - x)}{2^N - 1}, \ldots, x + \left(\frac{1 \cdot (1 - x)}{2^N - 1}\right), x \right\},$$

Where the amplitude set linearly increases from a value 'x' till '1'.

As an example, when N=4 and x=0.3, the amplitude set is given by $$A = \left\{ \begin{array}{l} 1, 0.9533, 0.9067, 0.8600, 0.8133, 0.7667, 0.7200, 0.6733, \\ 0.6267, 0.5800, 0.5333, 0.4867, 0.4400, 0.3933, 0.3467, 0.3 \end{array} \right\}$$

In accordance with an exemplary embodiment, the amplitude sets defined for quantizing $a_{l,p}$ may be used for quantizing $b_{l,p,i,j}$ and the amplitude sets defined for quantizing $b_{l,p,i,j}$ may be used for quantizing $a_{l,p}$.

Configuration of Delays, Number of Reported Combining Coefficients and Reporting of Combining Coefficients In accordance with some exemplary embodiment, the parameter $D^{(l)}$ depends on the configured codebook size ($N_3$), such that $D^{(l)}$=func($N_3$). For example, the parameter $D^{(l)}$ may be given by $D^{(l)}$=$pN_3$, where the parameter $p \leq 1$ controls the feedback overhead. The parameter p may be configured via higher layer (RRC parameter) or physical layer (L1 parameter) by the gNB or another network entity. Examples for p are $$p \in \left\{\frac{1}{8}, \frac{1}{4}, \frac{1}{2}, \frac{3}{4}\right\}.$$

In accordance with some exemplary embodiment, the UE is configured with a parameter of K, indicating the maximum number of non-zero coefficients to be reported for a single layer of the precoder matrix by higher layer (RRC). The value of K may depend on the size of the bitmap used for indicating the non-zero combining coefficients reported by the UE. The bitmap size depends on the number of configured delays $D^{(l)}$ and the number of configured spatial beams $U^{(l)}$. Its size if given by $2D^{(l)}U^{(l)}$. Hence the specific value of K may be defined by a function $K=func(D^{(l)}, U^{(l)})$. For example, the parameter K may be given by $K=\beta 2D^{(l)}U^{(l)}$ or $K=\beta D^{(l)}U^{(l)}$, where the parameter $\beta \leq 1$ controls the feedback overhead. The parameter $\beta$ may be configured via higher layer (RRC parameter) or physical layer (L1 parameter) by the gNB or another network entity. Examples for $\beta$ are $$\beta \in \left\{\frac{1}{8}, \frac{1}{4}, \frac{1}{2}, \frac{3}{4}\right\}.$$

In accordance with an exemplary embodiment, the UE is configured with a parameter $\tilde{K}$, indicating the maximum number of non-zero coefficients to be reported by the UE for a subset of layers (e.g., layer 3 and layer 4) or all layers. The UE then may select not more than re non-zero combining coefficients $\gamma_{p,i,j}^{(l)}$, for the subset of layers (and not per layer) or all layers to calculate the precoder matrix. The case of selecting not more than $\tilde{K}$ coefficients for a subset of layers or all layers may lead to an improved system performance compared to the case of selecting not more than K coefficients per layer.

In accordance with an exemplary embodiment, the UE is configured with the parameter K and/or $\tilde{K}$ via higher layer (RRC parameter) or physical layer (L1 parameter) by the gNB or another network entity, or K and/or $\tilde{K}$ may be a priori known at the UE.

In accordance with an exemplary embodiment, the parameter K and/or the parameter $\tilde{K}$ depends on the rank of the channel (transmission rank) and may be different for each layer or a set of layers. For example, for a rank-4 transmission for the first and second layer, the UE is configured with the parameter K per layer and for other two layers, the UE is configured with the parameters $\alpha_1 K$ and $\alpha_2 K$ for the third and fourth layer, respectively, where $\alpha_1 \leq 1$ and $\alpha_2 \leq 1$ are parameters to control the feedback overhead for reporting the combining coefficients of the third and fourth layers. The parameters $\alpha_1$ and $\alpha_2$ may be a priori known at the UE or configured by the gNB.

In accordance with an exemplary embodiment, the UE reports the selected $K_1$ non-zero combining coefficients $\gamma_{p,i,j}^{(l)}$, where $K_1 \leq K$, or $K_1 \leq \tilde{K}$ and indicates the selected non-zero combining coefficients for the layer or set of layers in the bitmap(s) by setting the associated bits to "1".

In accordance with an exemplary embodiment, in order to save feedback overhead the UE is configured not to report the part of the bitmap corresponding to the combining coefficients for which $a_{l,p}=0$. In this way, the size of bitmap reduces from $2U^{(l)}D^{(l)}$ to $U^{(l)}D^{(l)}$ bits, where $U^{(l)}$ denotes the number of configured spatial beams per polarization for the l-th layer, and $D^{(l)}$ denotes the number of configured delays for the l-th layer.

In accordance with an exemplary embodiment, the UE may be configured with $D^{(l)}$ delays per layer or for a subset of layers. The UE may select per layer or for the subset of layers $\tilde{D}^{(l)} \leq D^{(l)}$ delays from the second codebook, where the selected $\tilde{D}^{(l)}$ delays/delay vectors are common for all beams per layer or for the subset of layers. In this way, the size of the bitmap for indicating the non-zero combining coefficients reduces from to $2U^{(l)}D^{(l)}$ to $2U^{(l)}\tilde{D}^{(l)}$. The UE may report in addition to the selected delay vectors common to all beams, the value $\tilde{D}^{(l)}$ to the gNB via RRC or physical layer.

The constraint $D^{(l)} \leq D_{max}$ may ensure that the UE does not allocate more than $D_{max}$ delays to a specific layer. The values of $D^{(l)}$ are selected by the UE. The parameters D, $D^{(l)}$ and/or $D_{max}$ may be configured by the gNB, or a priori known at the UE. The selected values $D^{(l)}$ may or may not be reported via higher layer (RRC parameter) or physical layer (L1 parameter) to the gNB. The parameter $D_{max}$ may also depend on the layer or layer group index. For example, $D_{max}=7$ for the first layer (or the first and second layer) and $D_{max}=4$ for the second layer (or the third and fourth layer).

Extension to Higher Layer Transmission

In accordance with an exemplary embodiment, in order to reduce the UE calculation complexity and the feedback overhead of the CSI report, the selected $D^{(l)}$ delay DFT vectors, common to all beam/polarization indices, indicated by the single delay indicator, may be identical for a subset of layers or all layers, e.g., the first layer and the second layer (layer-common delay basis vector selection). The UE may be configured to indicate the selected $D^{(l)}$ delay DFT vectors common for the two layers in the CSI report.

In accordance with an exemplary embodiment, the configured $D^{(l)}$ delay DFT vectors, common to all beam/polarization indices, identical by the single delay indicator, may be identical for a subset of layers, e.g., the first layer and the second layer, and in addition, the bitmap for the two layers may be identical. In this way, the indices for the selected combining coefficients are identical for two layers (i.e., layer-common coefficient subset selection and layer-common delay basis selection). The UE may be configured to indicate the selected $D^{(l)}$ delay DFT vectors common to all beams/polarizations by the single delay indicator and the bitmap identical for the two layers in the CSI report.

In accordance with an exemplary embodiment, the selected $D^{(l)}$ delay DFT vectors, common to all beam/polarization indices, indicated by the single delay indicator, may be identical for a subset of layers or all layers, e.g., the first layer and the second layer (layer-common delay basis vector selection), but the bitmap of the two layers may be different. In this way, the indices for the selected combining coefficients may not be identical for the two layers (i.e., layer-independent coefficient subset selection and layer-common delay basis selection). The UE may be configured to indicate the selected $D^{(l)}$ delay DFT vectors common to all beams/polarizations by the single delay indicator and the bitmaps for the two layers in the CSI report.

In accordance with an exemplary embodiment, the UE is configured to select D delays for a subset of layers S, e.g., $S \in (1,2,3)$, where $D=\Sigma_{l \in S} D^{(l)}$, and the values of $D^{(l)}$ are freely selected by the UE. The parameter D may be configured by the gNB, or a priori known at the UE. The selected values $D^{(l)}$ may or may not be reported via higher layer (RRC parameter) or physical layer (L1 parameter) to the gNB.

In accordance with an exemplary embodiment, the UE is configured to select D delays for a subset of layers S, e.g., $S \in (1,2,3)$, where $D = \Sigma_{l \in S} D^{(l)}$, and $D^{(l)} \leq D_{max}$. The constraint $D^{(l)} \leq D_{max}$ may ensure that the UE does not allocate more than $D_{max}$ delays to a specific layer. The values of $D^{(l)}$ are selected by the UE. The parameters D, $D^{(l)}$ and/or $D_{max}$ may be configured by the gNB, or a priori known at the UE. The selected values $D^{(l)}$ may or may not be reported via higher layer (RRC parameter) or physical layer (L1 parameter) to the gNB. The parameter $D_{max}$ may also depend on the layer or layer group index. For example, $D_{max}=7$ for the first layer (or the first and second layer) and $D_{max}=4$ for the second layer (or the third and fourth layer).

In accordance with an exemplary embodiment, the UE is configured to select $U^{(l,l')}$ DFT beams for the l-th and the l' layer (e.g., layer 3 and layer 4), where $U^{(l,l')}=U^{(l)}+U^{(l')}$, and the values of $U^{(l)}$ and $U^{(l')}$ are freely selected by the UE. The parameter $U^{(l,l')}$ may be configured by the gNB, or a priori known at the UE. The selected values $U^{(l)}$ and $U^{(l')}$ may or may not be reported via higher layer (RRC parameter) or physical layer (L1 parameter) to the gNB.

In accordance with an exemplary embodiment, the UE is configured to select U DFT beams for a subset of layers S, e.g., $S \in (1,2,3)$, where $U = \Sigma_{l \in S} U^{(l)}$, and the values of $U^{(l)}$ are freely selected by the UE. The parameter U may be configured by the gNB, or a priori known at the UE. The selected values $U^{(l)}$ may or may not be reported via higher layer (RRC parameter) or physical layer (L1 parameter) to the gNB.

In accordance with an exemplary embodiment, the UE is configured to select U DFT beams for a subset of layers S, e.g., $S \in (1,2,3)$, where $U = \Sigma_{l \in S} U^{(l)}$, and $U^{(l)} \leq U_{max}$. The constraint $U^{(l)} \leq U_{max}$ may ensure that the UE does not allocate more than $U_{max}$ beams to a specific layer. The values of $U^{(l)}$ are selected by the UE. The parameters U, $U^{(l)}$ and/or $U_{max}$ may be configured by the gNB, or a priori known at the UE. The selected values $U^{(l)}$ may or may not be reported via higher layer (RRC parameter) or physical layer (L1 parameter) to the gNB. The parameter $U_{max}$ may also depend on the layer or layer group index. For example, $U_{max}=4$ for the first layer (or the first and second layer) and $U_{max}=2$ for the second layer (or the third and fourth layer).

In accordance with an exemplary embodiment, the UE is configured to select $U^{(l)}$ DFT beams for the l-th layer and $U^{(l')}$ DFT beams for the l'-th layer, where $l' \geq l$. In order to reduce the feedback overhead of the CSI report for the higher layers, the number of DFT beams over the layers is decreasing $U^{(l')} \leq U^{(l)}$.

In accordance with an exemplary embodiment, the UE is configured to select DM delay DFT vectors common to all beam indices of the l-th layer and the UE selects $D^{(l')}$ delay DFT vectors for the l'-th layer, where $l' \geq l$. In order to reduce the feedback overhead of the CSI report for the higher layers, the number of delay DFT vectors over the layers is decreasing $D^{(l')} \leq D^{(l)}$.

When using higher rank transmission, the energy of the l'-th layer is spread across multiple delays. In order to capture the energy which is spread over multiple delays, the delays over the layers may as well be increasing i.e., $D^{(l')} \geq D^{(l)}$.

Reporting on PUCCH/PUSCH—UCI Design

In accordance with some exemplary embodiments, the CSI report is a part of the uplink control information (UCI) to be transmitted by the UE in the physical uplink control channel (PUCCH) or physical uplink shared channel (PUSCH). The CSI report may comprise two parts: a part-1 CSI report and a part-2 CSI report. The part-1 CSI report has a fixed payload size and contains at least one of the following parameters:
- an indication of the values ($K_1$) of non-zero combining coefficients per layer, or a subset of layers,
- an indication of the total number of non-zero reference polarization-specific amplitude values for the layers,
- an indication of the selected number of common delays per layer or a set of layers, and
- an indication of the selected number of spatial beams per layer or a set of layers.

The part-2 CSI report includes the two precoding matrix identifiers $PMI(i_1)$ and $PMI(i_2)$, where $PMI(i_1)$ contains the $U^{(l)}$ selected spatial beam indices for the selected subgroups from the first codebook and the selected subgroup indices $(q_{1,i}=0, \ldots, O_{1,i}-1)$, $i=1, 2$ per layer, or a subset of layers, and per dimension of the antenna array. In addition, $PMI(i_1)$ contains a number of delay identifiers indicating the common delay vectors selected by the UE from an orthogonal subgroup from the second codebook per layer or a subset of layers and the bitmap(s) per layer or a subset of layers for indicating the indices of the selected $K_1$ non-zero coefficients to be reported per layer, and
- in the case of quantization scheme (5), the strongest coefficient indicator, which indicates the position of the strongest combining coefficient (which is not reported) associated with the stronger polarization per layer or a subset of layers, and a polarization-specific common amplitude value which is associated with the combining coefficients of the weaker polarization per layer or a set of layers.

$PMI(i_2)$ contains the $K_1-1$ phase values and $K_1-1$ amplitude values per layer for all layers.

As mentioned above, the CSI report is a part of the uplink control information (UCI) to be transmitted by the UE in the physical uplink control channel (PUCCH) or physical uplink shared channel (PUSCH). The CSI report may comprise two parts: a part-1 CSI report and a part-2 CSI report. Also described is that the part-1 CSI report has a fixed payload size and contains an indication of the values ($K_1$) of non-zero combining coefficients for all layers of the precoder matrix to be reported by the UE. The part-2 CSI report includes the two precoding matrix identifiers $PMI(i_1)$ and $PMI(i_2)$, where $PMI(i_1)$ contains the $U^{(l)}$ selected spatial beam indices for the selected subgroups from the first codebook and the selected subgroup indices $(q_{1,i}=0, \ldots, O_{1,i}-1)$, $i=1, 2$ per layer and per dimension of the antenna array. In addition, $PMI(i_1)$ contains the single delay identifier indicating the T common delay vectors selected by the UE from an orthogonal subgroup from the second codebook and the subgroup index $(q_2=0, \ldots, Q_2-1)$ indicating the selected subgroup, the bitmap for indicating the indices of the selected $K_1$ non-zero coefficients to be reported, and with respect to the described schemes (1)-(4):
- in the case of quantization scheme (1), the strongest coefficient indicator, which indicates the position of the strongest combining coefficient (which is not reported) in the bitmap,
- in the case of quantization scheme (2), $2U^{(l)}-1$ common amplitude coefficients $a_{l,p,j}$ for the l-th layer, a strongest beam indicator that indicates the indices ($\tilde{p} \in \{1,2\}$, $\tilde{\imath} \in \{0, \ldots, U\,1\}$) associated with the strongest/leading beam (for which $a_{l,\tilde{p},\tilde{\imath}}=1$), and the position of the strongest combining coefficient (which is not reported) out of T combining coefficients associated with the strongest/leading beam in the bitmap, in the case of quantization scheme (3), T−1 common amplitude coefficients $c_{l,\tilde{p},j}$ for the l-th layer, a strongest delay indicator that indicates the index ($\tilde{j} \in \{0, \ldots, T-1\}$) of the strongest delay vector (for which $c_{l,\tilde{p},\tilde{j}}=1$), and the position of the strongest combining coefficient (which is not reported) out of 2U combining coefficients associated with the strongest delay vector in the bitmap, in the case of quantization scheme (4), 2U−1 common amplitude coefficients $a_{l,p,i}$ and T−1 common amplitude coefficients $c_{l,j}$ for the l-th layer, the strongest delay indicator which indicates the index ($\tilde{j} \in \{0, \ldots, T-1\}$) of the strongest delay vector (for which $c_{l,\tilde{j}}=1$), and the strongest beam indicator that indicates the indices ($\tilde{p} \in \{1,2\}$, $\tilde{i} \in \{0, \ldots, U-1\}$) associated with the strongest/leading beam (for which $a_{l,\tilde{p},\tilde{i}}=1$).

Codebook Subset Restriction—Extension to Two Codebook Case

The spatial beam vectors and delay vectors that may be selected by the UE may be aligned with the multipath structure of the radio channel. Some of the spatial beam vectors and delay vectors selected by one UE may cause significant interference to other UEs within the same cell (multi-user/intra-cell interference) or to other UEs in neighboring cells (inter-cell interference). FIG. 1 shows an example of inter-cell interference, where for the selected spatial beam and delay vectors at the gNB, the second spatial beam and third delay vector may cause significant interference to the UE of the neighboring cell. Hence, in order to reduce multi-user interference and inter-cell interference, the UE may be configured per layer with a first subset $\mathcal{F}_1$ of beam vectors from the first codebook and with a second subset $\mathcal{F}_2$ of delay vectors from the second codebook. In this way, the transmission is restricted to specific directions and delays.

In accordance with some exemplary embodiments, the subset $\mathcal{F}_1$ of the beam vectors and the subset $\mathcal{F}_2$ of the delay vectors may be indicated by higher layer (RRC) by the gNB, or a priori known at the UE, or reported as a part of the CSI report by the UE to the gNB. In addition, the UE may be configured with a maximum allowed amplitude value for each beam vector in $\mathcal{F}_1$. The maximum amplitude value may restrict the amplitude values of the combining coefficients associated with the beam vector. In one example, the maximum amplitude value $w_z$ for the z-th beam vector in $\mathcal{F}_1$ may restrict the common amplitude value $a_{l,p,i}$ of the combining coefficients $\gamma_{p,i,d}^{(l)}$, such that $a_{l,p,i} \le w_z$. In another instance, the maximum amplitude value $w_z$ for the z-th beam vector in $\mathcal{F}_1$ may restrict the amplitudes $|\gamma_{p,i,d}^{(l)}|$ of the combining coefficients $\gamma_{p,i,d}^{(l)}$, such that $|\gamma_{p,i,d}^{(l)}| \le w_z$, $\forall d$. In another instance, the maximum amplitude value $w_z$ for the z-th beam vector in $\mathcal{F}_1$ may restrict the average power $$\sqrt{\sum_d |\gamma_{p,i,d}^{(l)}|^2}$$

of the combining coefficients $\gamma_{p,i,d}^{(l)}$, such that $$\sqrt{\sum_d |\gamma_{p,i,d}^{(l)}|^2} \le w_z.$$

Furthermore, the UE may be configured with a maximum allowed amplitude value for each delay vector in subset $\mathcal{F}_2$. The maximum amplitude value may restrict the amplitude values of the combining coefficients associated with a delay vector. In one example, the maximum amplitude value $u_t$ for the t-th delay vector in $\mathcal{F}_2$ may restrict the common amplitude value $c_{l,d}$ of the combining coefficients $\gamma_{p,i,d}^{(l)}$, such that $c_{l,d} \le u_t$. In another instance, the maximum amplitude value $u_t$ for the t-th delay vector in $\mathcal{F}_2$ may restrict the amplitude of the combining coefficients $\gamma_{p,i,d}^{(l)}$, such that $$|\gamma_{p,i,d}^{(l)}| \le u_t, \forall p, i.$$

In another instance, the maximum amplitude value $u_t$ for the t-th delay vector in $\mathcal{F}_2$ may restrict the power of the combining coefficients, such that $$\sqrt{\sum_{p,i} |\gamma_{p,i,d}^{(l)}|^2} \le u_t.$$

The maximum amplitude coefficients for the vectors in $\mathcal{F}_1$ and the amplitude coefficients for the vectors in $\mathcal{F}_2$ are signaled by the gNB by higher (RRC) layer, or they a priori known at the UE, or reported by the UE to the gNB by higher layer (RRC).

In accordance with some exemplary embodiments, the beam vectors in subset and the maximum amplitude coefficients for the beam vectors may be indicated by a bitmap B. Similarly, the delay vectors in subset $\mathcal{F}_2$ and the maximum amplitude coefficients for the delay vectors may be indicated by a bitmap C.

In accordance with some exemplary embodiments, the bitmap B may be comprised of two parts, $B = B_1 B_2$, where the first part $B_1$ may indicate G beam groups ($g=1, \ldots, G$), where each beam group may comprise R beam vectors. In one instance, the number of beam vectors $R = N_1 N_2$, so that in each of the G beam groups there are $N_1 N_2$ beam vectors and a total of $GN_1 N_2$ beam vectors in subset $\mathcal{F}_1$. An example of the beam vector subset $\mathcal{F}_1$ comprising 2 beam groups is shown in FIG. 2. The second part $B_2$ may be defined by a $BN_B$-length bit sequence $$B_2 = b_2^{(g,R-1)}, \ldots, b_2^{(g,0)}, r = 0, \ldots, R-1,$$

where $b_2^{(g,r)} = b_{2,0}^{(g,r)}, \ldots, b_{2,N_B-1}^{(g,r)}$ is a bit sequence of length $N_B$ indicating the maximum allowed amplitude value $w_{g,r}$ for the r-th beam vector in the g-th beam group in $\mathcal{F}_1$. In one instance, $N_B = 2$ and the maximum amplitude values are defined by the mapping in Table 1. FIG. 3 illustrates as an example the maximum amplitude level per beam vector in a beam group of $N_1 N_2 = 16$ vectors and 4 amplitude levels.

TABLE 1

Mapping of bits $b^{(g,r)}_{2,0}$, $b^{(g,r)}_{2,1}$ to maximum amplitude coefficient for $N_B = 2$.

| Bits $b^{(g,r)}_{2,0}, b^{(g,r)}_{2,1}$ | Maximum amplitude coefficient $w_{g,r}$ |
|---|---|
| 00 | 0 |
| 01 | $\sqrt{1/4}\sqrt{}$ |
| 10 | $\sqrt{1/2}\sqrt{}$ |
| 11 | 1 |

In another instance, $N_B=1$ and the maximum amplitude values are defined by the mapping in Table 2 or the mapping in Table 3.

TABLE 2

Mapping of bit $b^{(g,r)}_{2,0}$ to maximum amplitude coefficient for $N_B = 1$.

| Bit $b^{(g,r)}_{2,0}$ | Maximum amplitude value $w_{g,r}$ |
|---|---|
| 0 | 0 |
| 1 | $\sqrt{1/2}$ |

TABLE 3

Mapping of bit $b^{(g,r)}_{2,0}$ to maximum amplitude coefficient for $N_B = 1$.

| Bit $b^{(g,r)}_{2,0}$ | Maximum amplitude value $w_{g,r}$ |
|---|---|
| 0 | 0 |
| 1 | 1 |

In accordance with some exemplary embodiments, each of the G beam groups indicated by the bitmap $B_1$ may be comprised of $N_1 N_2$ orthogonal DFT beam vectors selected from the first codebook, where the indices of the beam vectors of the g-th beam group are defined by the index set:

$$I(r_1^{(g)}, r_2^{(g)}) = \{(r_1^{(g)} N_1 + x_1, r_2^{(g)} N_2 + x_2) : x_1 = 0, 1, \ldots, N_1-1, x_2 = 0, 1, \ldots, N_2-1\},$$

where $f = O_{1,1} r_2^{(g)} + r_1^{(g)}$ for $r_1^{(g)} \in \{0, \ldots, O_{1,1}-1\}$, $r_2^{(g)} \in \{0, \ldots, O_{1,2}-1\}$ denotes the beam group index indicated by the bitmap $B_1$. The corresponding DFT beam vectors $v_{l,m}$ with $(l,m) \in I(r_1^{(g)}, r_2^{(g)})$ in the g-th beam group are then defined by $$v_{l,m} = \begin{bmatrix} u_m & \exp\left(j \frac{2\pi l}{O_{1,1} N_1}\right) u_m & \ldots & \exp\left(j \frac{2\pi l(N_1 - 1)}{O_{1,1} N_1}\right) u_m \end{bmatrix}^T,$$

$$u_m = \begin{bmatrix} 1 & \exp\left(j \frac{2\pi m}{O_{1,2} N_2}\right) u_m & \ldots & \exp\left(j \frac{2\pi m(N_2 - 1)}{O_{1,2} N_2}\right) \end{bmatrix}^T \text{ for } N_2 > 1, \text{ and}$$

$$u_m = 1 \text{ for } N_2 = 1.$$

In accordance with some exemplary embodiments, the bitmap B may be signaled from the gNB to the UE via higher layer (RRC).

In accordance with some exemplary embodiments, the bitmap C may be comprised of two parts, $C = C_1 C_2$, where the first part $C_1$ indicates H delay vector groups (h=1, ..., H), where each delay vector group comprises V delay vectors. In one instance, the number of beam vectors $V=N_3$, so that in each of the H delay vector groups there are $N_3$ delay vectors and a total of $HN_3$ delay vectors in subset $\mathcal{F}_2$. An example of the delay vector subset $\mathcal{F}_2$ is shown in FIG. 4. The second part $C_2$ may be defined by a $VN_C$-length bit sequence $$C_2 = c_2^{(h,V-1)}, \ldots, c_2^{(h,0)},$$

where $c_2^{(h,v)} = c_{2,0}^{(h,v)}, \ldots, b_{2,N_C-1}^{(h,v)}$ is a bit sequence of length $N_C$ indicating the maximum allowed amplitude value $u_{h,v}$ for the v-th delay vector in the h-th delay vector group. In one instance, $N_C=2$ and the maximum amplitude values are defined by the mapping in Table 4. FIG. 5 illustrates as an example the maximum amplitude level per delay vector in a delay group of $N_3=8$ vectors and 4 amplitude levels.

TABLE 4

Mapping of bits $c^{(h,v)}_{2,0}$, $c^{(h,v)}_{2,1}$ to maximum amplitude values for $N_C = 2$.

| Bits $c^{(h,v)}_{2,0}, c^{(h,v)}_{2,1}$ | Maximum amplitude value $u_{h,v}$ |
|---|---|
| 00 | 0 |
| 01 | $\sqrt{1/4}\sqrt{}$ |
| 10 | $\sqrt{1/2}\sqrt{}$ |
| 11 | 1 |

In another instance, $N_C=2$ and the associated amplitude values are defined by the mapping in Table 5.

TABLE 5

Mapping of bits $c^{(h,v)}_{2,0}$, $c^{(h,v)}_{2,1}$ to maximum amplitude values for $N_C = 2$.

| Bits $c^{(h,v)}_{2,0}, c^{(h,v)}_{2,1}$ | Maximum amplitude value $u_{h,v}$ |
|---|---|
| 00 | 0 |
| 01 | 1/4 |
| 10 | 1/2 |
| 11 | 1 |

In another instance, $N_C=1$ and the maximum amplitude values are defined by the mapping shown in Table 6, Table 7, or Table 8.

TABLE 6

Mapping of bit $c^{(h,v)}_{2,0}$ to maximum amplitude value for $N_C = 1$.

| Bits $c^{(h,v)}_{2,0}$ | Maximum amplitude value $u_{h,v}$ |
|---|---|
| 0 | 0 |
| 1 | $\sqrt{1/2}$ |

TABLE 7

Mapping of bit $c^{(h,v)}_{2,0}$ to maximum amplitude value for $N_C = 1$.

| Bits $c^{(h,v)}_{2,0}$ | Maximum amplitude value $u_{h,v}$ |
|---|---|
| 0 | 0 |
| 1 | 1/2 |

Mapping of bit $c^{(h,v)}_{2,0}$ to maximum amplitude value for $N_C = 1$.

| Bits $c^{(h,v)}_{2,0}$ | Maximum amplitude value $u_{h,v}$ |
|---|---|
| 0 | 0 |
| 1 | 1 |

In accordance with some exemplary embodiments, each of the H delay vector groups comprises V orthogonal DFT delay vectors selected from the second codebook, where the indices of the delay vectors of the h-th delay group are defined by the index set:

$$l(r^{(h)})=\{(r^{(h)}N_3+x):x=0,1,\ldots,N_3-1\},$$

where $r^{(h)} \in \{0, \ldots, O_2-1\}$ represents the delay group index. The corresponding DFT delay vectors $f_d$ with $d \in I(r^{(h)})$ in the h-th delay group are then defined by $$f_d = \left[1 \;\; \exp\!\left(j\frac{2\pi d}{O_2 N_3}\right) \;\; \ldots \;\; \exp\!\left(j\frac{2\pi d(N_3-1)}{O_2 N_3}\right)\right]^T.$$

In accordance with some exemplary embodiments, the bitmap C may be signaled from the gNB to the UE via higher layer (RRC).

In accordance with some exemplary embodiments, the number of beams and delay vector groups may be identical and each beam vector group may be associated with a delay vector group, so that the gNB may configure the UE with G beam/delay vector groups with associated maximum amplitude coefficients for each beam and each delay vector in the beam/delay vector groups per layer to the UE. The UE may be configured to select the beam vectors and delay vectors from one beam/delay vector group and calculate the precoder used for the CSI report. The G beam/delay vector groups and the maximum amplitude coefficients are indicated by a bitmap D. The bitmap D may be comprised of four parts $D=D_1D_2D_3D_4$, where the first part $D_1$ may indicate the G beam groups (g=1, . . . , G), the second part $D_2$ may indicate the associated G delay groups, the third part $D_3$ may indicate the maximum amplitude coefficient for each beam vector in the G beam groups, and the fourth part $D_4$ may indicate the maximum amplitude coefficient for each delay vector in the G delay groups.

Figure 15:
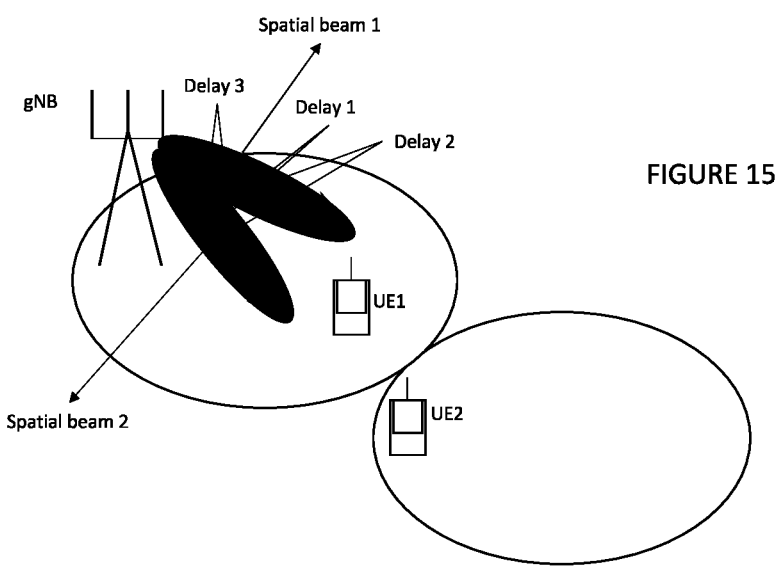
FIG. 15 is an Illustration of Codebook subset restriction on spatial beams and delays. Delay 3 associated with spatial beam 2 might cause high interference to adjacent cell UEs.

FIG. 15 is an Illustration of Codebook subset restriction on spatial beams and delays. Delay 3 associated with spatial beam 2 might cause high interference to adjacent cell UEs.

Figure 16:
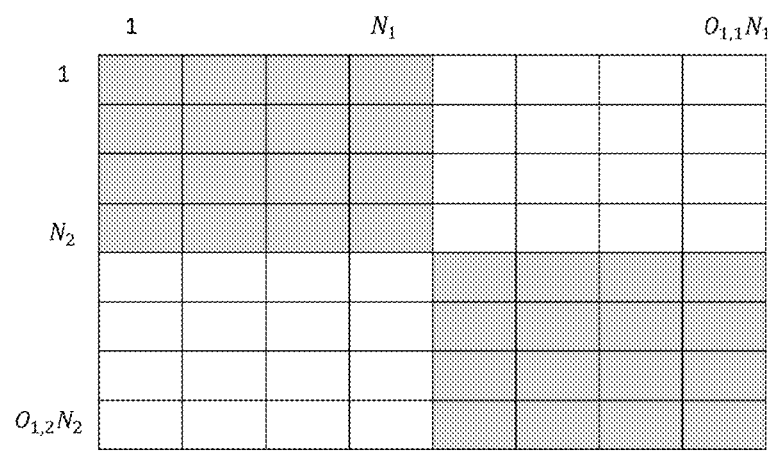
FIG. 16 shows the case of selecting X=2 beam groups out of $O_{1,1}O_{1,2}$=4 beam groups when $N_1=N_2$=4 and $O_{1,1}=O_{1,2}$=2. Each beam group contains $N_1N_2$=16 vectors.

FIG. 16 shows the case of selecting X=2 beam groups out of $O_{1,1}O_{1,2}=4$ beam groups when $N_1=N_2=4$ and $O_{1,1}=O_{1,2}=2$. Each beam group contains $N_1N_2=16$ vectors.

Figure 17:
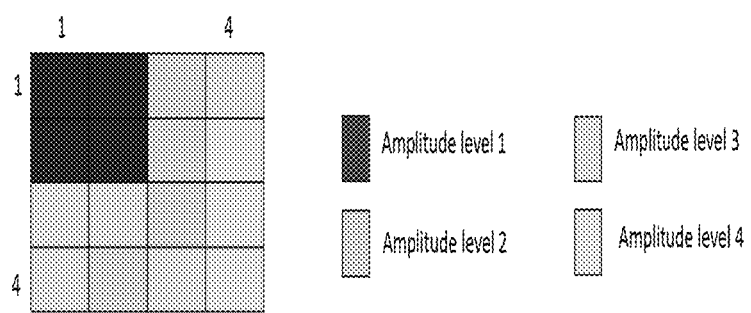
FIG. 17 shows the beam vectors restricted in one beam group containing $N_1N_2$=16 vectors using 4 amplitude levels depicted using 4 different colors.

FIG. 17 shows the beam vectors restricted in one beam group containing $N_1N_2=16$ vectors using 4 amplitude levels depicted using 4 different colors.

Figure 18:
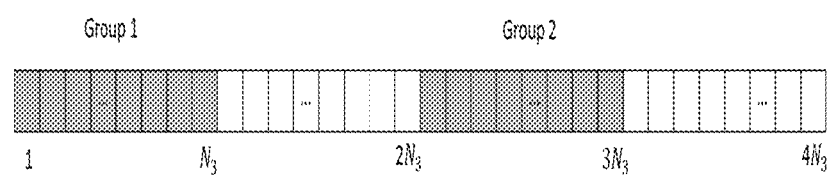
FIG. 18 Selecting H=2 delay groups out of $4N_3$ delay vectors when oversampling factor $O_2$=4.

FIG. 18 shows the case of selecting H=2 delay groups out of $4N_3$ delay vectors when oversampling factor $O_2=4$.

Figure 19:
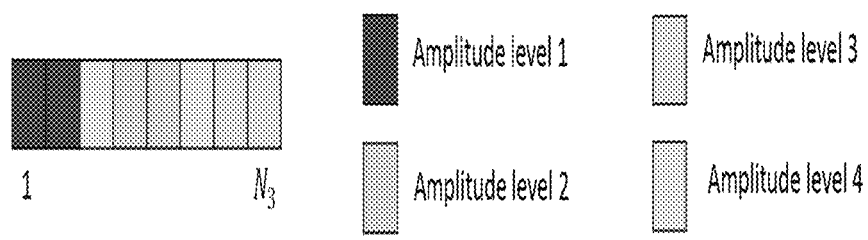
FIG. 19 shows the delay vectors restricted in one delay group of size $N_3$=8 using 4 amplitude levels depicted using 4 different colors.

FIG. 19 shows the delay vectors restricted in one delay group of size $N_3=8$ using 4 amplitude levels depicted using 4 different colors.

FIG. 20 illustrates unequal distribution of the amplitude values of the non-linear amplitude set A for N=4. 12 amplitude values lie in the range of '0' to '0.5' and 4 amplitude values lie in the range of '0.5' to '1'.

FIG. 21 depicts Equal distribution of amplitude values over the entire range of '0' to '1' of the linear amplitude set A for N=4.

FIG. 22 shows Comparison of the distribution of the amplitude values from non-linear and linear amplitude sets for N=4. In contrast to the non-linear amplitude set, where 12 values are allocated in the range of '0' to '0.5', only 8 values are allocated using the linear amplitude set.

Several advantages have substantially been demonstrated throughout the disclosure of the present invention. It is appreciated that the skilled person in the art understands that the exemplary embodiments are not restricted to the examples disclosed in the present disclosure.

Throughout this disclosure, the word "comprise" or "comprising" has been used in a non-limiting sense, i.e. meaning "consist at least or. Further, throughout the disclosure the operation of the UE and the network node or gNB have been described using the term "UE is configured to . . . " and gNB or network node is configured to.". This explicitly also means that there is a method performed in a UE which method comprises the corresponding operation of the UE but expressed in method terms/words. The same is applicable for the network node.

Although specific terms may be employed herein, they are used in a generic and descriptive sense only and not for purposes of limitation. The embodiments herein may be applied in any wireless systems including GSM, 3G or WCDMA, LTE or 4G, LTE-A (or LTE-Advanced), 5G, WiMAX, WiFi, satellite communications, TV broadcasting etc. that may employ beamforming technology.

REFERENCES

[1] 3GPP TS 38.214 V15.3.0: "3GPP; TSG RAN; NR; "Physical layer procedures for data (Release 15)", Sep. 2018.
[2] Samsung, "Revised WID: Enhancements on MIMO for NR", RP-182067, 3GPP RAN #81, Gold Coast, Australia, Sep. 10-13, 2018.
[3] C. Oestges, D. Vanhoenacker-Janvier, and B. Clerckx: "Macrocellular directional channel modeling at 1.9 GHz: cluster parametrization and validation," VTC 2005 Spring, Stockholm, Sweden, May 2005.

The invention claimed is:

1. A method performed by a User Equipment, UE, the method comprising:
receiving from a network node, a radio signal via a Multiple Input Multiple Output, MIMO, channel, wherein the radio signal contains at least one Down-Link, DL, reference signal according to a DL reference signal configuration;
estimating said MIMO channel based on said received at least one DL reference signal for configured resource blocks;
calculating a precoding matrix for a number of antenna ports of the network node and configured subbands; the precoding matrix being based on a first codebook and on a second codebook and a set of combination coefficients for complex scaling/combining one or more of vectors selected from the first codebook and the second codebook, wherein the first codebook contains one or more transmit-side spatial beam components/vectors of the precoding matrix and the second codebook contains one or more delay components/vectors of the precoding matrix;
receiving from said network node a higher layer configuration comprising indicating a subset of beam vectors from the first codebook and a maximum allowable average amplitude value per beam vector for restricting the average amplitude, or power, of the combining coefficients associated with the beam vector; and
reporting, to the network node, a Channel State Information, CSI, feedback and/or a Precoder matrix Indicator, PMI and/or a PMI/Rank Indicator, PMI/RI, used to indicate the precoding matrix for configured antenna ports and subbands, wherein the report contains a bitmap for indicating at least selected delay vectors and spatial beam vectors associated with non-zero combining coefficients of said set of combination coefficients.

2. The method according to claim 1 wherein the precoding matrix, $F^{(l)}=[G_1^{(l)T}\ G_2^{(l)T}]^T$, of a l-th transmission layer is represented by a double sum notation for a first polarization of the antenna ports, $$G_1^{(l)} = \alpha^{(l)} \sum_{u=0}^{U^{(l)}-1} b_u^{(l)} \sum_{d=0}^{D^{(l)}-1} \gamma_{1,u,d}^{(l)} d_{1,u,d}^{(l)T},$$

and for a second polarization of the antenna ports, $$G_2^{(l)} = \alpha^{(l)} \sum_{u=0}^{U^{(l)}-1} b_u^{(l)} \sum_{d=0}^{D^{(l)}-1} \gamma_{2,u,d}^{(l)} d_{2,u,d}^{(l)T},$$

wherein $b_u^{(l)}=(u=0,\ldots,U^{(l)}-1)$ representing $U^{(l)}$ selected beam components or Discrete Fourier Transform, DFT-based beam vectors selected from the first codebook for $N_1N_2$ antenna ports, where $N_1$ and $N_2$ refer to the number of antenna ports of a same polarization in a first and second dimension of an antenna array of the network node, respectively, $d_{p,u,d}^{(l)}$ ($d=0,\ldots,D^{(l)}-1$) representing $D^{(l)}$ selected delay components or Discrete Fourier Transform, DFT-based delay vectors for the u-th beam selected from the second codebook, wherein the number of DFT-based delay vectors $D^{(l)}$ is identical for all the beams, $\gamma_{p,u,d}^{(l)}$ are the complex combining coefficients associated with the $U^{(l)}$ selected beam vectors and $D^{(l)}$ selected delay vectors, and $\alpha^{(l)}$ is a normalizing scalar.

3. The method according to claim 1 wherein the maximum allowable average amplitude value $w_z$ for a z-th beam vector in the subset of beam vectors from the first codebook restricts the average amplitude, or power, $$\sqrt{\sum_d |\gamma_{p,i,d}^{(l)}|^2}$$

of the associated combining coefficients $\gamma_{p,i,d}^{(l)}$ of a l-th layer by $$\sqrt{\sum_d |\gamma_{p,i,d}^{(l)}|^2} \leq w_z$$

for the i-th beam, d-th delay and p-th polarization.

4. The method according to claim 1, further comprising indicating beam vectors in the subset of beam vectors and the maximum allowable average amplitude value per beam vector by a bitmap B, wherein the bitmap B comprises two parts, a first bitmap part $B_1$ and a second bitmap part $B_2$, wherein $B=B_1B_2$.

5. The method according to claim 4 wherein the first bitmap part $B_1$ indicates G beam groups (g=1,...,G), where each beam group comprises R beam vectors.

6. The method according to claim 4 wherein the second bitmap part $B_2$ is defined by a $RN_B$-length bit sequence $B_2=b_2^{(g,R-1)},\ldots,b_2^{(g,0)}$, r=0,..., R-1, where $[b_2^{(g,r)}\ldots,b_{2,N_B-1}^{(g,r)}]$ is a bit sequence of length $N_B$ indicating the maximum allowed average amplitude value $w_{g,r}$ for the r-th beam vector in the g-th beam group in the subset of beam vectors.

7. The method according to claim 6 wherein a mapping of bits $b_{2,0}^{(g,r)}, b_{2,1}^{(g,r)}$ to a maximum allowable average amplitude for $N_B=2$ is given by:

| Bits $b_{2,0}^{(g,r)}, b_{2,1}^{(g,r)}$ | Maximum amplitude coefficient $w_{g,r}$ |
| --- | --- |
| 00 | 0 |
| 01 | $\sqrt{1/4}\sqrt{}$ |
| 10 | $\sqrt{1/2}\sqrt{}$ |
| 11 | 1 | wherein z in $b_{2,0}^{(g,z)}, b_{2,1}^{(g,z)}$ represents the index of the r-th beam vector.

8. The method according to claim 1 wherein the report is transmitted in an uplink control information in a physical uplink control channel, and wherein the report comprises two parts including a first part and a second part and wherein the first part has a fixed payload size and contains at least a parameter indicating a number of non-zero combining coefficients for all layers.

9. The method according to claim 8 comprising reporting a strongest coefficient indicator which indicates the position of a strongest combining coefficient associated with a stronger polarization per layer, and a polarization-specific common amplitude value which is associated with the combining coefficients of a weaker polarization per layer.

10. The method according to claim 8 wherein the second part includes a first precoding matrix identifier and a second precoding matrix identifier, wherein the first precoding matrix identifier contains a number of selected spatial beam indices for a selected subgroup from the first codebook, selected subgroup indices for a subset of layers, and $K_1-1$ phase values and $K_1-1$ amplitude values per layer for all layers, wherein $K_1$ represents a number of non-zero combining coefficients per layer.

11. The method according to claim 1, further comprising quantizing and reporting the combining coefficients per beam of the precoding matrix, wherein each combining coefficient $\gamma_{p,i,j}^{(l)}$ is a product of three coefficients $a_{l,p,i}, b_{l,p,i,j}$ and $d_{l,p,i,j}$, and is given by:

$$\gamma_{p,i,j}^{(l)}=a_{l,p,i}b_{l,p,i,j}d_{l,p,i,j},$$

where $a_{l,p,i}$ is a real-valued coefficient representing a common amplitude across all combining coefficients associated with a i-th beam, p-th polarization and l-th layer, $b_{l,p,i,j}$ is a real-valued normalized combining-coefficient representing the amplitude associated with the i-th beam, j-th delay vector, p-th polarization and l-th layer, and $$d_{l,p,i,j} = \exp\left(\frac{\sqrt{-1}\,2\pi n}{2^N}\right);$$

$n \in \{0, 1, \ldots, 2^N-1\}$, $N \in \{0,1,2,3,4\}$ $$\left[d_{l,p,i,j} = \exp\left(\frac{j2\pi n}{2^N}\right); n \in \{0, 1, \ldots, 2^N-1\}, N \in \{1, 2, 3, 4\}\right]$$

is a coefficient to indicate the phase of $\gamma_{p,i,j}^{(l)}$.

12. The method according to claim 1, further comprising quantizing and reporting the combining coefficients per beam of the precoding matrix, wherein each combining coefficient $\gamma_{p,i,j}^{(l)}$ is a product of three coefficients $a_{l,p,i}$, $b_{l,p,i,j}$ and $d_{l,p,i,j}$, and is given by:

$$\gamma_{p,i,j}^{(l)} = a_{l,p,i} b_{l,p,i,j} d_{l,p,i,j},$$

where $a_{l,p,i}$ is a polarization-specific real-valued coefficient representing a common amplitude across all combining coefficients associated with the p-th polarization and l-th layer, $b_{l,p,i,j}$ is a real-valued normalized combining-coefficient representing the amplitude associated with the i-th spatial beam vector, j-the delay vector, p-th polarization and l-th layer, and $$d_{l,p,i,j} = \exp\left(\frac{\sqrt{-1}\,2\pi n}{2^N}\right); n \in \{0, 1, \ldots, 2^N - 1\}, N \in \{0, 1, 2, 3, 4\}$$

is a coefficient to indicate the phase of $\gamma_{p,i,j}^{(l)}$.

13. The method according to claim 11 wherein the amplitudes $a_{l,p,i}$ are partitioned, per layer, into at least two disjoint subsets, and each subset is assigned a single and different value for said quantization.

14. The method according to claim 13 wherein each subset contains the amplitudes $a_{l,p,i}$ with respect to a single polarization.

15. The method according to claim 13 wherein the amplitudes $a_{l,p,i}$ of the first subset contains the strongest amplitude and is quantized with 0 bits and not reported, and the amplitudes $a_{l,p,i}$ of the second subset are quantized with N=1 or 2 or 3 or 4 bits and reported.

16. The method according to claim 11, further comprising partitioning the amplitudes $b_{l,p,i,j}$, per layer, into at least two disjoint subsets per layer and each subset is assigned a single value for quantization of the amplitudes $b_{l,p,i,j}$.

17. The method according to claim 16 wherein the first subset of said distinct subsets contains the amplitudes $b_{l,p,i,j}$, corresponding to a number less or equal of K selected non-zero combining coefficients, indicated by the bitmap, and the second subset contains the remaining amplitude coefficients.

18. The method according to claim 17 wherein the amplitudes of the first subset are quantized with N=2, or 3 bits and reported, and the amplitudes of the second subset are quantized with 0 bits and not reported.

19. The method according to claim 11, further comprising partitioning the phases $d_{l,p,i,j}$ into at least two disjoint subsets, per layer, and each subset is assigned a single value for phase quantization.

20. The method according to claim 19 wherein the first subset contains the phases corresponding to a number less or equal of K selected non-zero combining coefficients, indicated by the bitmap, and the second subset contains the remaining phases, and wherein the phases of the first subset are quantized with N=2 or 3 or 4 bits and reported, and the phases of the second subset are quantized with 0 bits and not reported.

21. The method according to claim 16 wherein the bitmap is used to indicate reported phases from the first subset and second subset and wherein the same bitmap is used for indicating the amplitudes $b_{l,p,i,j}$ of the first subset and the second subset.

22. A method performed by a network node the method comprising:
   transmitting to a User Equipment, UE, a radio signal via a Multiple Input Multiple Output, MIMO, channel, wherein the radio signal contains at least one DownLink, DL, reference signal according to a DL reference signal configuration;
   receiving from the UE a report including a Channel State Information, CSI, feedback and/or a Precoder Matrix Indicator, PMI and/or a PMI/Rank Indicator, PMI/RI, used to indicate a precoding matrix for configured antenna ports and configured subbands, the precoding matrix being based on a first codebook and on a second codebook and a set of combination coefficients for complex scaling/combining one or more of vectors selected from the first codebook and the second codebook, wherein the first codebook contains one or more transmit-side spatial beam components/vectors of the precoding matrix and the second codebook contains one or more delay components/vectors of the precoding matrix;
   configuring the UE with a higher layer configuration comprising a subset of beam vectors from the first codebook and a maximum allowable average amplitude value per beam vector for restricting the average amplitude, or power, of the combining coefficients associated with the beam vector;
   and wherein the report contains a bitmap for indicating at least selected delay vectors and spatial beam vectors associated with non-zero combining coefficients of said set of combination coefficients.

23. The method according to claim 22 comprising receiving the report in an uplink control information in a physical uplink control channel, and wherein the report comprises two parts including a first part and a second part and wherein the first part has a fixed payload size and contains at least a parameter indicating values of non-zero combining coefficients per layer.

24. A User Equipment, UE, comprising a processor and a memory, said memory containing instructions executable by said processor whereby said UE is operative to:
   receive from a network node, a radio signal via a Multiple Input Multiple Output, MIMO, channel, wherein the radio signal contains at least one DownLink, DL, reference signal according to a DL reference signal configuration;
   estimate said MIMO channel based on said received at least one DL reference signal for configured resource blocks;
   calculate a precoding matrix for a number of antenna ports of the network node and configured subbands; the precoding matrix being based on a first codebook and on a second codebook and a set of combination coefficients for complex scaling/combining one or more of vectors selected from the first codebook and the second codebook, wherein the first codebook contains one or more transmit-side spatial beam components/vectors of the precoding matrix and the second codebook contains one or more delay components/vectors of the precoding matrix;
   receive from said network node a higher layer configuration comprising indicating a subset of beam vectors from the first codebook and a maximum allowable average amplitude value per beam vector for restricting the average amplitude, or power, of the combining coefficients associated with the beam vector; and report, to the network node, a Channel State Information, CSI, feedback and/or a Precoder matrix Indicator, PMI and/or a PMI/Rank Indicator, PMI/RI, used to indicate the precoding matrix for configured antenna ports and subbands, wherein the report contains a bitmap for indicating at least selected delay vectors and spatial beam vectors associated with the non-zero combining coefficients of said set of combination coefficients.

25. A network node comprising a processor and a memory, said memory containing instructions executable by said processor whereby said network node is operative to:
   transmit to a User Equipment, UE, a radio signal via a Multiple Input Multiple Output, MIMO, channel, wherein the radio signal contains at least one DownLink, DL, reference signal according to a DL reference signal configuration;
   receive from the UE a report including a Channel State Information, CSI, feedback and/or a Precoder Matrix Indicator, PMI and/or a PMI/Rank Indicator, PMI/RI, used to indicate a precoding matrix for configured antenna ports and configured subbands, the precoding matrix being based on a first codebook and on a second codebook and a set of combination coefficients for complex scaling/combining one or more of vectors selected from the first codebook and the second codebook, wherein the first codebook contains one or more transmit-side spatial beam components/vectors of the precoding matrix and the second codebook contains one or more delay components/vectors of the precoding matrix; and
   configure the UE with a higher layer configuration comprising a subset of beam vectors from the first codebook and a maximum allowable average amplitude value per beam vector for restricting the average amplitude, or power, of the combining coefficients associated with the beam vector; and wherein the report contains a bitmap for indicating at least selected delay vectors and spatial beam vectors associated with non-zero combining coefficients of said set of combination coefficients.

26. The method according to claim 6 wherein a mapping of bit $b_{2,0}^{(g,r)}$ to maximum amplitude coefficient for $N_B=1$ is given by:

| Bit $b^{(g,r)}_{2,0}$ | Maximum amplitude value $w_{g,r}$ |
|---|---|
| 0 | 0 |
| 1 | 1. |

* * * * *